United States Patent
Kitahara et al.

(10) Patent No.: US 9,179,165 B2
(45) Date of Patent: *Nov. 3, 2015

(54) VIDEO ENCODING CONTROL METHOD, VIDEO ENCODING APPARATUS AND VIDEO ENCODING PROGRAM

(75) Inventors: Masaki Kitahara, Yokosuka (JP); Atsushi Shimizu, Yokosuka (JP); Naoki Ono, Yokosuka (JP)

(73) Assignee: Nippon Telegraph and Telephone Corporation, Tokyo (JP)

(*) Notice: Subject to any disclaimer, the term of this patent is extended or adjusted under 35 U.S.C. 154(b) by 310 days.

This patent is subject to a terminal disclaimer.

(21) Appl. No.: 13/695,700

(22) PCT Filed: Apr. 28, 2011

(86) PCT No.: PCT/JP2011/060364
§ 371 (c)(1), (2), (4) Date: Nov. 1, 2012

(87) PCT Pub. No.: WO2011/138923
PCT Pub. Date: Nov. 10, 2011

(65) Prior Publication Data
US 2013/0051456 A1 Feb. 28, 2013

(30) Foreign Application Priority Data

| May 7, 2010 | (JP) | 2010-106851 |
| May 7, 2010 | (JP) | 2010-106852 |
| May 7, 2010 | (JP) | 2010-106853 |
| May 7, 2010 | (JP) | 2010-106854 |
| May 7, 2010 | (JP) | 2010-106855 |

(51) Int. Cl.
*H04N 7/26* (2006.01)
*H04N 19/85* (2014.01)
(Continued)

(52) U.S. Cl.
CPC ............ *H04N 19/85* (2014.11); *H04N 19/114* (2014.11); *H04N 19/117* (2014.11);
(Continued)

(58) Field of Classification Search
CPC . H04N 19/114; H04N 19/117; H04N 19/124; H04N 19/132; H04N 19/15; H04N 19/152; H04N 19/172; H04N 19/177; H04N 19/194; H04N 19/61; H04N 19/80; H04N 19/85; H04N 7/50; H04N 7/26941; H04N 21/2365; H04N 21/4347; H04N 7/26244
USPC ................................................ 375/240.26
See application file for complete search history.

(56) References Cited

U.S. PATENT DOCUMENTS

| 5,134,476 A | 7/1992 | Aravind et al. |
| 5,589,884 A | 12/1996 | Ohguchi |

(Continued)

FOREIGN PATENT DOCUMENTS

| CN | 1353547 A | 6/2002 |
| CN | 1617591 A | 5/2005 |

(Continued)

OTHER PUBLICATIONS

Ma et al, Rate Control for JVT Video Coding Scheme With HRD Considerations, 2003.*

(Continued)

*Primary Examiner* — Shan Elahi
(74) *Attorney, Agent, or Firm* — Harness, Dickey & Pierce, P.L.C.

(57) ABSTRACT

In a video encoding control method of the present invention, each picture is encoded in units of encoding-order picture groups such as GOPs, and when CPB underflow has occurred, an encoding parameter such as a quantization parameter and filter strength of a pre-filter is changed in such a manner that a generated bit rate is reduced, and an encoding-order picture group that is being encoded is re-encoded from its first picture using the changed encoding parameter.

11 Claims, 21 Drawing Sheets

(51) Int. Cl.

| | | |
|---|---|---|
| *H04N 19/172* | (2014.01) | |
| *H04N 19/15* | (2014.01) | |
| *H04N 19/61* | (2014.01) | |
| *H04N 19/114* | (2014.01) | |
| *H04N 19/117* | (2014.01) | |
| *H04N 19/124* | (2014.01) | |
| *H04N 19/132* | (2014.01) | |
| *H04N 19/152* | (2014.01) | |
| *H04N 19/177* | (2014.01) | |
| *H04N 19/194* | (2014.01) | |
| *H04N 19/80* | (2014.01) | |

(52) U.S. Cl.
CPC .......... *H04N 19/124* (2014.11); *H04N 19/132* (2014.11); *H04N 19/15* (2014.11); *H04N 19/152* (2014.11); *H04N 19/172* (2014.11); *H04N 19/177* (2014.11); *H04N 19/194* (2014.11); *H04N 19/61* (2014.11); *H04N 19/80* (2014.11)

(56) References Cited

U.S. PATENT DOCUMENTS

| | | | | |
|---|---|---|---|---|
| 5,606,369 | A * | 2/1997 | Keesman et al. | 375/240.01 |
| 5,786,858 | A * | 7/1998 | Yagasaki et al. | 375/240.15 |
| 5,805,228 | A | 9/1998 | Proctor et al. | |
| 5,831,678 | A | 11/1998 | Proctor | |
| 5,864,681 | A | 1/1999 | Proctor et al. | |
| 6,072,830 | A | 6/2000 | Proctor et al. | |
| 6,101,195 | A | 8/2000 | Lyons et al. | |
| 6,167,088 | A | 12/2000 | Sethuraman | |
| 6,208,691 | B1 * | 3/2001 | Balakrishnan et al. | 375/240.12 |
| 6,300,973 | B1 * | 10/2001 | Feder et al. | 348/14.09 |
| 6,301,428 | B1 | 10/2001 | Linzer | |
| 6,310,915 | B1 * | 10/2001 | Wells et al. | 375/240.03 |
| 6,347,117 | B1 | 2/2002 | Kato et al. | |
| 6,493,402 | B1 * | 12/2002 | Fimoff | 375/321 |
| 6,522,693 | B1 | 2/2003 | Lu et al. | |
| 6,553,150 | B1 | 4/2003 | Wee et al. | |
| 6,674,797 | B1 | 1/2004 | Golin | |
| 6,678,332 | B1 | 1/2004 | Gardere et al. | |
| 6,754,279 | B2 | 6/2004 | Zhou et al. | |
| 6,791,609 | B2 | 9/2004 | Yamauchi et al. | |
| 6,792,047 | B1 | 9/2004 | Bixby et al. | |
| 6,836,289 | B2 | 12/2004 | Koshiba et al. | |
| 6,873,658 | B2 | 3/2005 | Zhou | |
| 6,944,221 | B1 | 9/2005 | Keesman | |
| 6,990,144 | B2 | 1/2006 | Tsukagoshi et al. | |
| 7,023,924 | B1 | 4/2006 | Keller et al. | |
| 7,099,389 | B1 | 8/2006 | Yu et al. | |
| 7,346,106 | B1 | 3/2008 | Jiang et al. | |
| 7,356,079 | B2 | 4/2008 | Laksono et al. | |
| 7,613,345 | B2 | 11/2009 | Kajiwara et al. | |
| 7,688,890 | B2 | 3/2010 | Kondo et al. | |
| 7,970,055 | B2 | 6/2011 | Koto | |
| 8,107,524 | B2 | 1/2012 | Laksono | |
| 8,189,679 | B2 | 5/2012 | Tsukagoshi et al. | |
| 8,406,309 | B2 | 3/2013 | Lee et al. | |
| 8,548,048 | B2 | 10/2013 | El-Maleh et al. | |
| 2001/0003534 | A1 * | 6/2001 | Saunders et al. | 375/240.16 |
| 2001/0045988 | A1 | 11/2001 | Yamauchi et al. | |
| 2001/0053182 | A1 | 12/2001 | Ishiyama | |
| 2002/0003578 | A1 | 1/2002 | Koshiba et al. | |
| 2002/0012054 | A1 | 1/2002 | Osamato et al. | |
| 2002/0012055 | A1 | 1/2002 | Koshiba et al. | |
| 2002/0012398 | A1 | 1/2002 | Zhou et al. | |
| 2002/0015447 | A1 | 2/2002 | Zhou | |
| 2002/0027604 | A1 | 3/2002 | Hung | |
| 2002/0039384 | A1 | 4/2002 | Kato | |
| 2002/0094031 | A1 * | 7/2002 | Ngai et al. | 375/240.27 |
| 2002/0135683 | A1 | 9/2002 | Tamama et al. | |
| 2002/0159528 | A1 * | 10/2002 | Graziani et al. | 375/240.16 |
| 2002/0186774 | A1 * | 12/2002 | Pau et al. | 375/240.26 |
| 2003/0012290 | A1 * | 1/2003 | Fimoff et al. | 375/265 |
| 2003/0031251 | A1 | 2/2003 | Koto | |
| 2003/0039308 | A1 * | 2/2003 | Wu et al. | 375/240.12 |
| 2003/0112864 | A1 | 6/2003 | Karczewicz et al. | |
| 2003/0222998 | A1 | 12/2003 | Yamauchi | |
| 2004/0013195 | A1 | 1/2004 | Panusopone et al. | |
| 2004/0114817 | A1 * | 6/2004 | Jayant et al. | 382/239 |
| 2004/0208135 | A1 | 10/2004 | Nakamura et al. | |
| 2005/0053302 | A1 * | 3/2005 | Srinivasan et al. | 382/248 |
| 2005/0074061 | A1 | 4/2005 | Ribas-Corbera et al. | |
| 2005/0105883 | A1 * | 5/2005 | Holcomb et al. | 386/69 |
| 2005/0152448 | A1 * | 7/2005 | Crinon et al. | 375/240.01 |
| 2005/0175093 | A1 | 8/2005 | Haskell et al. | |
| 2005/0193408 | A1 * | 9/2005 | Sull et al. | 725/32 |
| 2005/0210145 | A1 * | 9/2005 | Kim et al. | 709/231 |
| 2005/0220353 | A1 | 10/2005 | Karczewicz et al. | |
| 2005/0286631 | A1 | 12/2005 | Wu et al. | |
| 2006/0126713 | A1 | 6/2006 | Chou et al. | |
| 2006/0126728 | A1 | 6/2006 | Yu et al. | |
| 2006/0188020 | A1 | 8/2006 | Wang | |
| 2006/0256868 | A1 * | 11/2006 | Westerman | 375/240.24 |
| 2006/0274830 | A1 | 12/2006 | Koto | |
| 2007/0025441 | A1 * | 2/2007 | Ugur et al. | 375/240.03 |
| 2007/0025446 | A1 * | 2/2007 | Matsumoto et al. | 375/240.21 |
| 2007/0064815 | A1 | 3/2007 | Alvarez et al. | |
| 2007/0074266 | A1 * | 3/2007 | Raveendran et al. | 725/135 |
| 2007/0081586 | A1 * | 4/2007 | Raveendran et al. | 375/240.1 |
| 2007/0081587 | A1 * | 4/2007 | Raveendran et al. | 375/240.1 |
| 2007/0081588 | A1 * | 4/2007 | Raveendran et al. | 375/240.1 |
| 2007/0140345 | A1 | 6/2007 | Osamoto et al. | |
| 2007/0153914 | A1 * | 7/2007 | Hannuksela et al. | 375/240.26 |
| 2008/0055119 | A1 | 3/2008 | Sadowski et al. | |
| 2008/0059823 | A1 | 3/2008 | Balatsos et al. | |
| 2008/0069203 | A1 | 3/2008 | Karczewicz et al. | |
| 2008/0080619 | A1 * | 4/2008 | Heng et al. | 375/240.18 |
| 2008/0101466 | A1 * | 5/2008 | Swenson et al. | 375/240.07 |
| 2008/0120676 | A1 | 5/2008 | Morad et al. | |
| 2009/0161766 | A1 * | 6/2009 | Bronstein et al. | 375/240.23 |
| 2009/0168866 | A1 | 7/2009 | Takahashi et al. | |
| 2009/0168900 | A1 * | 7/2009 | Shimoyama et al. | 375/240.26 |
| 2010/0232720 | A1 | 9/2010 | Tsai et al. | |
| 2010/0322318 | A1 | 12/2010 | Sadowski et al. | |
| 2011/0051806 | A1 | 3/2011 | Lee | |
| 2011/0199504 | A1 | 8/2011 | Oka | |
| 2011/0292995 | A1 * | 12/2011 | Kubota | 375/240.02 |

FOREIGN PATENT DOCUMENTS

| | | |
|---|---|---|
| CN | 1668107 A | 9/2005 |
| CN | 1926863 A | 3/2007 |
| CN | 1937777 A | 3/2007 |
| CN | 101087408 A | 12/2007 |
| CN | 101233757 A | 7/2008 |
| CN | 101253777 A | 8/2008 |
| EP | 1 030 523 B1 | 4/2010 |
| JP | 07-184196 A | 7/1995 |
| JP | 10-210475 A | 8/1998 |
| JP | 10-304311 A | 11/1998 |
| JP | 11-112601 A | 4/1999 |
| JP | 2000-209584 A | 7/2000 |
| JP | 2001-359097 A | 12/2001 |
| JP | 2003-018603 A | 1/2003 |
| JP | 2003-092759 A | 3/2003 |
| JP | 2003-125400 A | 4/2003 |
| JP | 2005-072742 A | 3/2005 |
| JP | 2005-080004 A | 3/2005 |
| JP | 2006-295535 A | 10/2005 |
| JP | 2006-180036 A | 7/2006 |
| JP | 2006-295535 A | 10/2006 |
| JP | 2006-332842 A | 12/2006 |
| JP | 2007-028647 A | 2/2007 |
| JP | 2007-208377 A | 8/2007 |
| JP | 2008-109259 A | 5/2008 |
| JP | 2008-252562 A | 10/2008 |
| JP | 2008-258858 A | 10/2008 |
| JP | 2009-260595 A | 11/2009 |
| KR | 10-1995-0030491 A | 11/1995 |
| KR | 10-1996-0009752 A | 3/1996 |
| KR | 10-1997-0019622 A | 4/1997 |
| KR | 10-1997-0025160 A | 5/1997 |

(56) References Cited

FOREIGN PATENT DOCUMENTS

| KR | 10-1997-0032066 A | 6/1997 |
|---|---|---|
| KR | 10-2001-0030362 A | 4/2001 |
| KR | 10-2008-0061744 A | 7/2008 |
| KR | 10-2009-0112747 A | 10/2009 |
| RU | 2123769 C1 | 12/1998 |
| RU | 2310290 C2 | 11/2007 |
| RU | 2 385 541 C2 | 3/2010 |
| TW | 404137 B | 9/2000 |
| WO | 91/14295 A1 | 9/1991 |
| WO | 02/096120 A1 | 11/2002 |

OTHER PUBLICATIONS

Kadono, Kikuchi, and Suzuki, "H.264/AVC Textbook, Third revised Version" issued by Impress R & D, 2009, pp. 189-191, with partial translation.
Okutomi, Ozawa, Shimizu, and Hori, "Digital Image Processing," Corporation Picture Information Education Advancement Association, 2004, pp. 108-110, with partial translation.
International Search Report for PCT/JP2011/060364, ISA/JP, mailed Jun. 21, 2011.
Decision on Grant, Russian Patent Application No. 2012146537, May 26, 2014.
Westerink, R H., et al., "Two-pass MPEG-2 variable-bit-rate encoding," IBM Journal of Research and Development, vol. 43, No. 4, Jul. 1999, pp. 471-488.
Notice of Allowance of Patent, Korean Patent Application No. 10-2012-7028798, Jan. 28, 2014.
Search Report, European Patent Application No. 11777442.2, Mar. 6, 2014.
International Search Report, Application No. PCT/JP2011/060522, Jun. 21, 2011.
Notice of Allowance of Patent, Korean Patent Application No. 10-2012-7029220, Feb. 5, 2014.
Decision on Grant, Russian Patent Application No. 2012147239, Apr. 28, 2014.
Office Action, Taiwanese Patent Application No. 100115900, Oct. 13, 2014.
First Office Action, Chinese Patent Application No. 201180022987.1, Nov. 26, 2014.
Office Action, U.S. Appl. No. 13/395,865, Feb. 12, 2015.
Li, Z.G., et al., "Adaptive rate control for H.264," Journal of Visual Communication and Image Representation, vol. 17, No. 2, Apr. 2006, pp. 376-406.
Chen, Jiann-Jone, et al., "Source Model for Transform Video Coder and Its Application—Part II: Variable Frame Rate Coding," IEEE Transactions on Circuits and Systems for Video Technology, vol. 7, No. 2, Apr. 1997, pp. 299-311.
International Search Report for PCT/JP2011/059727, ISA/JP, mailed Jul. 12, 2011.
International Preliminary Report on Patentability for PCT/JP2011/059727, IPEA/JP, mailed Aug. 21, 2012.
Search Report, European Patent Application No. 11777419.0, Nov. 20, 2013.
Notice of Reasons for Rejection, Japanese Patent Application No. 2012-513784, Dec. 20, 2013.
Office Action, Russian Patent Application No. 2012146549, Jan. 20, 2014.
Notice of Allowance of Patent, Korean Patent Application No. 10-2012-7028198, Jan. 28, 2014.
Office Action, Taiwanese Patent Application No. 100114408, May 21, 2014.
Notice of Allowance, Japanese Patent Application No. 2012-513784, Jul. 15, 2014.
Decision on Grant, Russian Patent Application No. 2012146549, Jul. 28, 2014.
Notice of Allowance, Japanese Patent Application No. 2014-028378, Nov. 11, 2014.
Office Action, U.S. Appl. No. 13/695,768, Jan. 5, 2015.
Office Action, U.S. Appl. No. 13/695,768, Feb. 10, 2015.
Office Action, Chinese Patent Application No. 201180022113.6, Feb. 2, 2015.
Notice of Allowance, Taiwanese Patent Application No. 100115438, Feb. 26, 2015.
Notice of Allowance, U.S. Appl. No. 13/695,768, Jul. 1, 2015.
Office Action, Canadian Patent Application No. 2,798,012, Aug. 7, 2015.

\* cited by examiner

VIDEO ENCODING CONTROL METHOD, VIDEO ENCODING APPARATUS AND VIDEO ENCODING PROGRAM

CROSS-REFERENCE TO RELATED APPLICATIONS

This application is a 371 U.S. National Stage of International Application No. PCT/JP2011/060364, filed Apr. 28, 2011. This application claims priority to Japanese Patent Applications Nos. 2010-106851, filed May 7, 2010; 2010-106852, filed May 7, 2010; 2010-106853, filed May 7, 2010; 2010-106854, filed May 7, 2010; 2010-106855, filed May 7, 2010. The disclosures of the above applications are incorporated herein by reference.

TECHNICAL FIELD

The present invention relates to video encoding technology for encoding a video signal so that a hypothetical buffer such as a coded picture buffer (CPB) in a hypothetical decoder does not collapse and degradation of image quality does not increase.

Priority is claimed on Japanese Patent Application Nos. 2010-106851, 2010-106852, 2010-106853, 2010-106854 and 2010-106855, filed May 7, 2010, the entire contents of which are incorporated herein by references.

BACKGROUND ART

In encoding of a video signal, it is necessary to perform the encoding in such a manner that a decoder does not collapse. In an H.264 encoding scheme, a hypothetical decoder, HRD (Hypothetical Reference Decoder), obtained by modeling a decoder is defined. An H.264 encoder should perform encoding in such a manner that the hypothetical decoder does not collapse. The present invention is technology for suppressing collapse of a CPB of a hypothetical decoder, specifically, underflow of the CPB.

In FIG. 1, a conceptual diagram of the CPB underflow is illustrated. In the case of a constant bit rate, an encoded stream is input to the CPB at the bit rate, as indicated by an arrow A1. A data amount of the encoded stream in the CPB each time is referred to as a "residual bit rate." The hypothetical decoder pulls out the encoded stream corresponding to each picture from the CPB. In this case, the CPB residual bit rate is instantly reduced by a bit rate corresponding to the picture. An illustrative case of the constant bit rate is illustrated, but the same applies to a case of a variable bit rate.

The CPB underflow refers to a situation in which the encoded streams of the pictures are insufficient in the CPB when the hypothetical decoder attempts to pull out the encoded streams of the pictures in each time indicated by an arrow A2, as illustrated in FIG. 1. In H.264-based encoding, a state of the CPB should be verified while encoding is being performed to produce a stream not causing the CPB underflow. As described above, the CPB of the hypothetical decoder is standardized in H.264 and further details are described, for example, in the following Non-Patent Document 1.

Further, the same concept as the CPB is also defined in other encoding standards. For example, in MPEG-2, there is a VBV (video buffering verifier), and a buffer model of such a decoder is herein referred to as "a hypothetical buffer." In the following description, a "CPB" may be substituted with the term "hypothetical buffer" for interpretation in a broader sense.

Methods of encoding of a video signal include 1-pass encoding technology and multi-pass encoding technology. In the 1-pass encoding, generally, pictures of an input video are sequentially encoded. On the other hand, in the multi-pass encoding, an input video is encoded multiple times. In 2-pass encoding, second encoding is performed using a result of first encoding. Hereinafter, related art of the 1-pass encoding is referred to as "related art a" and related art of 2-pass encoding is referred to as "related art b."

<Related Art a>

In 1-pass encoding, since input pictures are sequentially encoded, the nature of a future picture after an encoding target picture is unknown. Accordingly, while there is an attempt to suppress the CPB underflow using 1-pass encoding, a generated bit rate is suppressed more than necessary and video quality is greatly degraded more than necessary. For example, in the technology of Patent Document 1, degree of complexity of a video obtained from a result of encoding in the past is used as an estimate of degree of complexity of other videos of a GOP before each picture is encoded. Under the premise of the estimate of the degree of complexity, a quantization parameter causing a maximum bit rate that can be used to encode the other videos of the GOP is estimated and used as a lower limit value of a quantization parameter during encoding of the encoding target picture. There is a problem in that the bit rate is suppressed more than necessary, causing degradation of video quality, when the other videos of the GOP are not complex in comparison with the estimated degree of complexity.

<Related Art b>

In 2-pass encoding, all pictures of an input video are encoded, and a bit rate of each picture generated at this time is used for second encoding. In this method, degree of complexity of each portion of the video can be recognized at the time of second encoding, unlike the case of the 1-pass encoding. Accordingly, the CPB underflow can be expected to be suppressed with degradation of video quality being suppressed. For example, in the technology of Patent Document 2, in first encoding, degree of complexity of each frame is obtained and an allocated bit rate of each frame is obtained. Also, it is verified if the CPB underflow occurs with the allocated bit rate. When the CPB underflow occurs, the allocated bit rate is modified. In other words, since the degree of complexity of each frame is recognized, the allocated bit rate can be modified only when the CPB underflow occurs. As a result, the CPB underflow can be suppressed while keeping video quality degradation smaller, as compared to related art a. However, in this method, there is a problem in that a calculation amount increases since all frames of an input video need be encoded twice.

DOCUMENTS OF THE PRIOR ART

Patent Documents

[Patent document 1] Japanese Unexamined Patent Application, First Application No. 2006-295535
[Patent document 2] Japanese Unexamined Patent Application, First Application No. 2003-018603

Non-Patent Document

[Non-Patent Document 1] Kadono, Kikuchi, and Suzuki, "H.264/AVC Textbook, Third revised Version" issued by Impress R & D, 2009, pp. 189-191.

DISCLOSURE OF INVENTION

Problem to be Solved by the Invention

In related art a described above, since encoding control is performed using only previously encoded information, great degradation of video quality occurs due to excessive suppression of a generated bit rate. On the other hand, according to related art b, the CPB underflow can be suppressed with degradation of the video quality being suppressed. However, in this method, there is a problem in that the calculation amount is large since all frames of an input video need be encoded twice.

An object of the present invention is to realize stable video quality while suppressing CPB underflow with a smaller calculation amount than conventional 2-pass encoding (related art b) to achieve the above-described object.

Means for Solving the Problem

In the description of the present invention, an "encoding-order picture group" is defined. The encoding-order picture group includes a predetermined number of pictures, with a first picture being an intra predictive encoded picture (an I picture) and is a collection of pictures successive in an encoding order. A typical example of the encoding-order picture group is a GOP (Group Of Pictures).

Conceptual diagrams of the encoding-order picture group are illustrated in FIGS. 2A to 2D. In FIGS. 2A to 2D, I indicates a picture that is an intra predictive encoding target (an I picture), P indicates a picture that is a forward predictive encoding target (a P picture), and B indicates a picture that is a bidirectional predictive encoding target (a B picture).

A display order of the pictures is assumed to be, for example, an order of I→B→P→B→P→B, . . . , as illustrated in FIG. 2A. If the encoding-order picture group cited in the present invention is assumed to be a GOP, the encoding-order picture group becomes a picture group of I→P→B→P→ . . . →B→P (immediately before I), as illustrated in FIG. 2B.

For example, when the encoding-order picture group includes 13 pictures, 13 pictures successive in an encoding order as illustrated in FIG. 2C form the encoding-order picture group cited in the present invention. Further, FIG. 2D illustrates an example in which an encoding-order picture group includes 20 pictures corresponding to two GOPs.

As described above, a collection of pictures in which a picture sequence of the input video is divided into groups of a predetermined number of pictures successive in a encoding order is referred to as the encoding-order picture group. Further, here, the "picture" refers to a frame when a video has a progressive format or refers to a frame of one field or a frame of a top field and a bottom field when a video has an interlaced format.

In a first embodiment of the present invention, encoding of an input video is carried out in units of encoding-order picture groups. However, it is checked if a CPB does not collapse using a predetermined buffer verification algorithm each time the input picture is encoded. The encoding parameter is changed in such a manner that a generated bit rate becomes small only when CPB underflow occurs, and then the encoding-order picture group that is being encoded is re-encoded. When the encoding of the encoding-order picture group is completed, an encoding result is output from an output buffer.

Examples of encoding parameters to be changed include a quantization parameter and pre-filter strength, and one or both of them are changed. For example, when the encoding parameter is the quantization parameter, a step size of the quantization parameter increases so that the encoding parameter causes the generated bit rate to be small. Further, when the filter strength of a pre-filter for an input video is changed, the blurring degree is changed to be greater so that the generated bit rate can be small.

When the re-encoding of the encoding-order picture group is completed, the encoding parameter restores to an encoding parameter value at the time of normal encoding. Accordingly, degradation of video quality is suppressed or reduced from spreading to a next encoding-order picture group. Here, the encoding parameter at the time of normal encoding refers to an encoding parameter determined in a state in which the encoding is not re-encoding.

Further, when the re-encoding of the encoding-order picture group is completed, the encoding parameter does not necessarily restore to the value at the time of normal encoding. A residual bit rate of a CPB is checked, and the encoding parameter restores to the value at the time of normal encoding only when the residual bit rate is equal to or greater than a predetermined threshold value. When the residual bit rate is smaller, the encoding parameter may not restore to the value at the time of normal encoding. This makes it possible to reduce the possibility of continuous occurrence of re-encoding.

Further, in the second embodiment of the present invention, even when the encoding-order picture group is re-encoded, it is checked if the CPB underflow has occurred each time each picture is encoded. When the CPB underflow has occurred, the encoding parameter is changed and the encoding-order picture group that is currently being encoded is re-encoded from its first picture. In other words, the same encoding-order picture group is repeatedly encoded multiple times only when the CPB underflow has occurred.

In this case, the number of times one encoding-order picture group is re-encoded is managed using a parameter called a retry count. When re-encoding occurs, a value of the retry count is incremented, and when encoding of the encoding-order picture group is completed, the value of the retry count is decremented. The value of the encoding parameter described above is set according to the size of the retry count, and a value with which a generated bit rate becomes small as the retry count increases is used. When the encoding parameter is the quantization parameter, the step size increases as the retry count increases. When the encoding parameter is the filter strength of the pre-filter, a blurring degree increases as the retry count increases.

Generally, a video serving as an encoding target includes a complex portion and a simple portion. If only one re-encoding is performed whether an encoding-order picture group that becomes a re-encoding target due to the CPB underflow is complex or simple, the CPB underflow should be suppressed by such one re-encoding. Accordingly, it is necessary to set the encoding parameter for re-encoding by increasing a change amount of the encoding parameter. This may cause excessively great degradation of video quality when re-encoding occurs in the complex portion of the video so that the CPB underflow can be avoided even when the change amount of the encoding parameter is small. That is, since the complex portion of the video (in which a number of high-frequency components are included and correlation in a time direction is small) has a large absolute amount of information, the bit rate is greatly reduced only with a small change in the encoding parameter. In other words, a change amount in the encoding parameter that is too large unnecessarily degrades video quality.

As described above, the encoding-order picture group is repeatedly encoded, the retry count is managed, and the encoding parameter is set according to a size of the retry count only when the CPB underflow occurs. Accordingly, a change amount of the encoding parameter is suppressed to be small and encoding is performed with an appropriate encoding parameter, thereby further reducing degradation of video quality.

In a third embodiment of the present invention, when encoding of the encoding-order picture group is completed, the value of the retry count is not unconditionally reduced, but the retry count is decremented only when the CPB residual bit rate is equal to or greater than a predetermined threshold value at a time at which encoding of the encoding-order picture group is completed.

The value of the encoding parameter described above is set according to a size of the retry count, and a value with which a generated bit rate becomes small as the retry count increases is used. When the encoding parameter is the quantization parameter, the step size increases as the retry count increases. When the encoding parameter is the filter strength of the pre-filter, the blurring degree increases as the retry count increases.

Generally, a video serving as an encoding target includes a complex portion and a simple portion. If only one re-encoding is performed whether an encoding-order picture group that becomes a re-encoding target due to the CPB underflow is complex or simple, the CPB underflow should be suppressed by such one re-encoding. Accordingly, it is necessary to set the encoding parameter for re-encoding by increasing a change amount of the encoding parameter. This may cause excessively great degradation of video quality when re-encoding occurs in the complex portion of the video so that the CPB underflow can be avoided even when the change amount of the encoding parameter is small. That is, since the complex portion of the video (in which a number of high-frequency components are included and correlation in a time direction is small) has a large absolute amount of information, the bit rate is greatly reduced only with a small change in the encoding parameter. In other words, a change amount in the encoding parameter that is too large unnecessarily degrades video quality.

As described above, the encoding-order picture group is repeatedly encoded, the retry count is managed, and the encoding parameter is set according to the size of the retry count only when the CPB underflow occurs. Accordingly, a change amount of the encoding parameter is suppressed to be small and encoding is performed with an appropriate encoding parameter, thereby further reducing degradation of video quality.

Further, an influence of degradation of video quality on a next encoding-order picture group is reduced basically by decrementing the retry count at a time at which the encoding of the encoding-order picture group is completed after the retry count increases and encoding is performed at the time of re-encoding. However, when the CPB residual bit rate is smaller than the predetermined amount, the retry count is not decremented. Accordingly, re-encoding is less likely to occur even in encoding of the next encoding-order picture group.

Further, in a fourth embodiment of the present invention, the encoding-order picture group may not necessarily be a GOP, but the first picture in the encoding-order picture group is the intra predictive encoded picture (the I picture). In this embodiment, encoding of an input video is carried out in units of encoding-order picture groups. However, it is checked if the CPB collapses using a predetermined buffer verification algorithm each time an input picture is encoded. When the CPB underflow has occurred, the encoding parameter is changed in such a manner that a generated bit rate becomes small, and re-encoded from a position of the encoding-order picture group set as a retry point (which will be described below). An encoding result is output from an output buffer when encoding of the encoding-order picture group is completed and re-encoding is determined not to be performed.

Examples of the encoding parameters to be changed include a quantization parameter and pre-filter strength, and one or both of them are changed. For example, when the encoding parameter is the quantization parameter, a step size of the quantization parameter increases so that the encoding parameter causes the generated bit rate to be small. Further, when the filter strength of a pre-filter for an input video is changed, the blurring degree is changed to be greater such that the generated bit rate can be small.

When re-encoding of the encoding-order picture group is completed, the encoding parameter restores to an encoding parameter value at the time of normal encoding. Accordingly, degradation of video quality is suppressed from spreading to a next encoding-order picture group. Here, the encoding parameter at the time of normal encoding refers to an encoding parameter determined in a state in which the encoding is not re-encoding.

Further, when re-encoding of the encoding-order picture group is completed, the encoding parameter does not necessarily restore to the value at the time of normal encoding. A residual bit rate of the CPB is checked. The encoding parameter restores to the value at the time of normal encoding only when the residual bit rate is equal to or greater than a predetermined threshold value, and when the residual bit rate is smaller, the encoding parameter may not restore to the value at the time of normal encoding. This makes it possible to reduce the possibility of continuous occurrence of re-encoding.

The retry point described above refers to position information indicating a picture from which re-encoding starts when re-encoding is necessary due to occurrence of the CPB underflow in a certain picture.

The retry point is basically a first picture in a currently encoded encoding-order picture group, but may be a first picture in a proximately previously encoded encoding-order picture group. The retry point is updated in the following case.

(1) When the CPB residual bit rate is equal to or greater than a predetermined threshold value at a time at which the encoding of the encoding-order picture group is completed, the retry point is set as a first picture (an I picture) in the next encoding-order picture group.

(2) When the CPB residual bit rate is smaller than the predetermined threshold value at a time at which the encoding of the encoding-order picture group is completed, the retry point remains unchanged and encoding is carried out on the first picture in the next encoding-order picture group. When the CPB underflow has not occurred in encoding of the first picture in the encoding-order picture group, the retry point is set to the first picture in the current encoded encoding-order picture group.

A reason for setting the retry point as described above will be described. If the retry point is always set to the first picture of the currently encoded encoding-order picture group, a processing configuration is simpler than the present invention. Hereinafter, this technology is referred to as "related art." Even in the case of the related art, a corresponding encoding-order picture group is re-encoded only when the CPB underflow has occurred. Accordingly, the CPB underflow can be suppressed, calculation can be reduced as compared to related art b in which all pictures of an input video are encoded twice, and effective bit rate distribution control can be realized.

As is well known, an I picture has a larger generated bit rate than other picture types. Accordingly, when a CPB residual bit rate at a time at which encoding of a certain encoding-order picture group is completed is small, the CPB underflow is highly likely to occur in an I picture that is a first picture of a next encoding-order picture group. In this case, in the above related art, there is a risk that video quality of the I picture being greatly degraded since the CPB underflow could be avoided by re-encoding only the I picture that is the first picture in which the CPB underflow has occurred.

In the present embodiment, if the CPB residual bit rate is small and the CPB underflow has occurred in the I picture that is a first picture of the next encoding-order picture group, an immediately previous encoding-order picture group is re-encoded from its first picture by a set retry point. Accordingly, occurrence of great degradation of video quality in one first picture can be avoided.

In a fifth embodiment of the present invention, a frame of the input video is not always encoded twice in order to suppress the CPB underflow, unlike the 2-pass encoding of related art. Basically, 1-pass encoding is used, and only a plurality of pictures are traced back and re-encoded only when the CPB underflow has occurred.

Further, in the present embodiment, when the CPB underflow has occurred in encoding of the picture in the encoding-order picture group, certain pictures of the encoding-order picture group are traced back and re-encoded. The pictures traced back and re-encoded are determined in advance by the memory amount available for re-encoding. Here, the maximum number of pictures that can be traced back at the time of re-encoding is defined as "a maximum inter-picture distance" in the description.

A process overview in the present embodiment is as follows. First, the maximum number of pictures that can be traced back at the time of re-encoding is obtained based on information of the available memory amount given from the outside, and is stored as the maximum inter-picture distance.

This is for the following reason. For re-encoding, it is necessary to hold an video signal of an encoding target picture in an input buffer and to hold encoded streams of an encoding result in an output buffer until output of the encoding result from the output buffer ends after pictures are determined that pictures are not to be re-encoded. If the available memory amount is sufficient, each of the input buffer and the output buffer has a memory capacity corresponding to the number of pictures in the encoding-order picture group, such that re-encoding at the time of occurrence of the CPB underflow can be performed from the first picture in the encoding-order picture group in units of encoding-order picture groups.

However, since the memory cannot necessarily be used as needed, the maximum inter-picture distance, which is the maximum number of pictures that can be traced back at the time of re-encoding, is calculated from the available memory amount in advance.

In the present embodiment, encoding of an input video is carried out in units of encoding-order picture groups. However, it is checked whether or not the CPB will collapse using a predetermined buffer verification algorithm each time an input picture is encoded. The encoding parameter is changed in such a manner that a generated bit rate becomes small and the encoding-order picture group that is being encoded is re-encoded only when a CPB underflow occurs. However, in the encoding-order picture group that is being encoded, pictures satisfying the following three conditions are traced back and re-encoded.

Condition 1: The picture is included in the encoding-order picture group that is being encoded.
    Condition 2: The picture is included in the maximum inter-picture distance from a picture in which the CPB underflow has occurred.
    Condition 3: The picture is a picture that is farthest from the picture in which the CPB underflow has occurred, among pictures satisfying conditions 1 and 2.

A picture from which re-encoding starts is referred to as a retry point. For example, if the first picture in the maximum inter-picture distance is in an immediately previous encoding-order picture group, the retry point is the first picture in the encoding-order picture group that is currently being encoded, and otherwise, the retry point is the first picture in the maximum inter-picture distance, i.e., the oldest encoded picture separated by the maximum inter-picture distance.

Examples of the encoding parameters to be changed at the time of re-encoding include a quantization parameter and pre-filter strength, and one or both of them are changed. For example, in the case of the quantization parameter, a step size of the quantization parameter increases so that the encoding parameter causes the generated bit rate to be small. Further, when the filter strength of the pre-filter for an input video is changed, the blurring degree is changed to be greater so that the generated bit rate can be small.

When the encoding of the encoding-order picture group that is currently being encoded is completed by re-encoding, the encoding parameter restores to a encoding parameter value at the time of normal encoding, thus suppressing degradation of video quality from spreading to a next encoding-order picture group. Here, the encoding parameter at the time of normal encoding refers to an encoding parameter determined in a state in which encoding is not re-encoding.

Further, when re-encoding of the encoding-order picture group is completed, the encoding parameter does not necessarily restore to the value at the time of normal encoding, but a residual bit rate of the CPB may be checked and the encoding parameter may restore to the value at the time of normal encoding only when the residual bit rate is equal to or greater than a predetermined threshold value and may not restore to the value at the time of normal encoding when the residual bit rate is smaller than the predetermined threshold value. This makes it possible to reduce the possibility of continuous occurrence of re-coding.

Effect of the Invention

According to the first embodiment of the present invention, the encoding-order picture group is encoded twice only when the CPB underflow has occurred, unlike conventional 2-pass encoding (related art b) in which all frames of the input video are encoded twice. At the time of re-encoding, encoding is performed with an encoding parameter for suppressing the CPB underflow. Accordingly, the calculation amount can be reduced as compared to related art b while the CPB underflow is suppressed as in related art b only when necessary.

According to the second and third embodiments of the present invention, the encoding-order picture group is encoded multiple times only when the CPB underflow has occurred, unlike 2-pass encoding (related art b) in which all frames of the input video are encoded twice. At the time of re-encoding, encoding is performed with an encoding parameter for suppressing the CPB underflow, as in the first embodiment. Accordingly, a calculation amount can be reduced as compared to related art b with the CPB underflow being suppressed as in related art b only when necessary.

In the second and third embodiments of the present invention, the change amount of the encoding parameter at the time of re-encoding is suppressed to be small by managing the retry count, thereby suppressing the CPB underflow. Accordingly, it is possible to reduce degradation of video quality due to re-encoding.

In particular, according to the third embodiments of the present invention, when the CPB residual bit rate after the re-encoding is small, the encoding parameter is maintained to be the same as that at the time of the re-encoding, thereby suppressing re-occurrence of the re-encoding.

Further, according to the fourth embodiment of the present invention, the encoding-order picture group is encoded twice only when the CPB underflow has occurred, unlike conventional 2-pass encoding (related art b) in which all frames of the input video are encoded twice. At the time of re-encoding, encoding is performed with an encoding parameter for suppressing the CPB underflow. Accordingly, a calculation amount can be reduced as compared to related art b while the CPB underflow is suppressed as in related art b only when necessary.

In particular, according to the fourth embodiment of the present invention, it is possible to prevent video quality of the first I picture in the encoding-order picture group from being greatly degraded since the occurrence of the CPB underflow of the first I picture in which a generated bit rate is large in the encoding-order picture group can effectively suppressed.

According to the fifth embodiment of the present invention, the encoding-order picture group is re-encoded from a picture determined as the retry point only when the CPB underflow has occurred, unlike conventional 2-pass encoding (related art b) in which all frames of the input video are encoded twice. At the time of re-encoding, encoding is performed with an encoding parameter for suppressing the CPB underflow. Accordingly, a calculation amount can be reduced as compared to related art b with the CPB underflow being suppressed as in related art b only when necessary. Further, since the re-encoding is performed from the retry point determined according to a memory amount required for re-encoding, the memory can be effectively used.

EMBODIMENTS FOR CARRYING OUT THE INVENTION

Hereinafter, embodiments of the present invention will be described in detail with reference to the drawings.

First Embodiment

Figure 3:
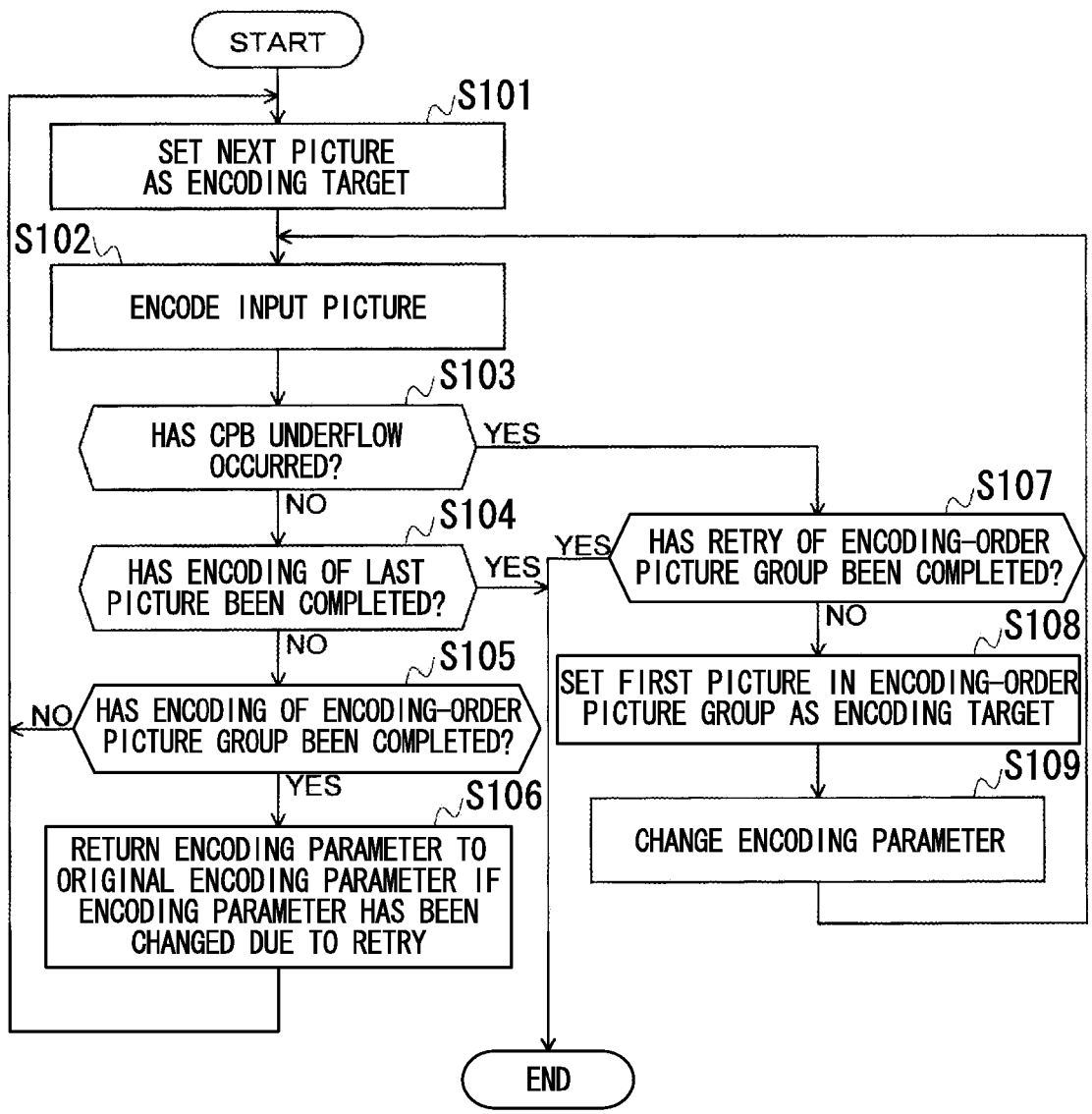
FIG. 3 is a flowchart illustrating a video encoding control method according to a first embodiment of the present invention.

FIG. 3 is a process flowchart illustrating a video encoding control method according to a first embodiment of the present invention.

First, a picture next to a picture for which encoding has ended in an input video signal is set as an encoding target (step S101). The input picture set as the encoding target is encoded using H.264 or any of other predetermined encoding schemes (step S102). A determination is made as to whether CPB underflow occurs due to encoding of the input picture (step S103). If the CPB underflow occurs, the process proceeds to step S107. Further, a determination may be made as to whether the CPB underflow has occurred, for example, using a method used in the H.264 standard.

If the CPB underflow does not occur, a determination is made as to whether encoding of a last picture is completed (step S104). If encoding of the last picture is completed, the encoding process ends.

Otherwise, a determination is made as to whether encoding of the encoding-order picture group is completed (step S5). If the encoding of the encoding-order picture group is not completed, the process restores to step S101 in which the encoding process continues to be similarly performed on a next picture. If the encoding of the encoding-order picture group is completed and the encoding parameter has been changed due to re-encoding (retry) of the encoding-order picture group, the encoding parameter restores to a value at the time of normal encoding (step S106) and the process returns to step S101 in which the encoding process is performed from a first picture of a next encoding-order picture group.

If the CPB underflow is determined in step S103 to occur, a determination is made as to whether the current encoding-order picture group has been re-encoded (the retry has been completed) (step S107). If the retry has been completed, the CPB underflow could not be avoided even when the encoding-order picture group is re-encoded. Accordingly, encoding ends. If the retry has not been completed, the first picture in the current encoding-order picture group is set as an encoding target in order to re-encode the current encoding-order picture group (step S108). Also, one or both of two encoding parameters (the quantization parameter and the pre-filter strength) are changed (for the quantization parameter, a step size is changed to be greater, and for the filter strength, a blurring degree is changed to be greater) (step S109). The process returns to step S102 in which the encoding-order picture group that is being encoded is re-encoded.

In other words, the encoding-order picture group (e.g., a GOP) is encoded twice only when the CPB underflow has occurred, unlike related art b in which all frames of the input video are encoded twice. At the time of second encoding, encoding is performed using an encoding parameter for suppressing the CPB underflow. A corresponding encoding-order picture group is re-encoded to suppress the CPB underflow only when the CPB underflow has occurred. Accordingly, a calculation amount can be reduced, as compared to related art b in which all pictures of the input video are encoded twice.

Figure 4:
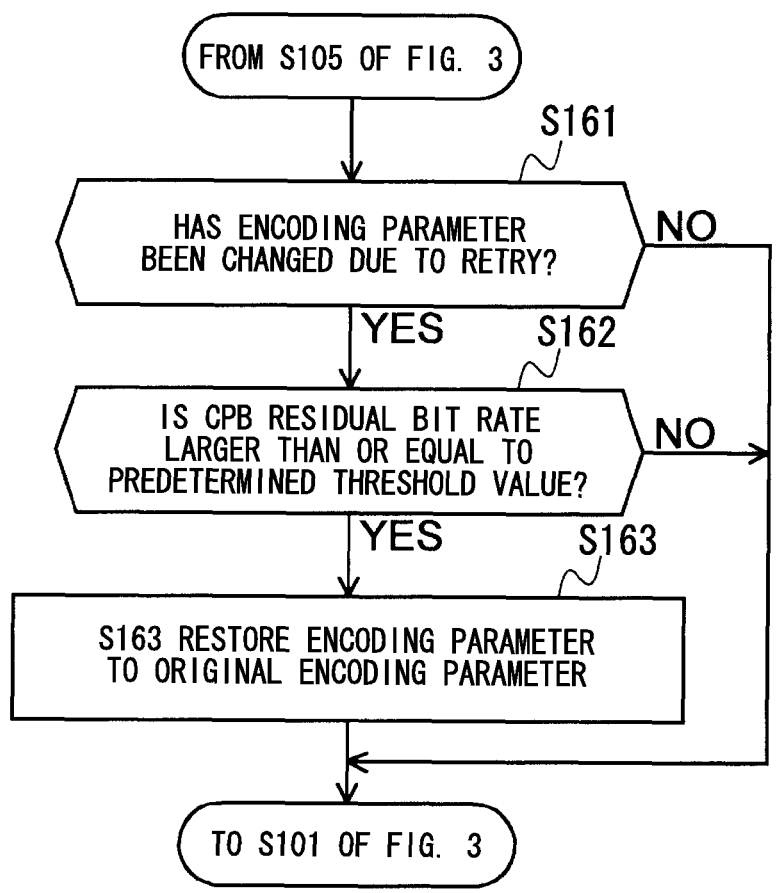
FIG. 4 is a flowchart of a variant of the video encoding control method according to the first embodiment of the present invention.

FIG. 4 is a process flowchart illustrating a video encoding control method according to a variant of the present embodiment. The present variant may be embodied by replacing the process of step S106 illustrated in FIG. 3 with a process of steps S161 to S163 illustrated in FIG. 4. The processes other than step S106 are similar to those in FIG. 3.

A determination is made as to whether the encoding parameter has been changed due to the retry after the process of step S105 in FIG. 3 (step S161). If the encoding parameter has not been changed due to the retry, the process returns to step S101 in FIG. 3. If the encoding parameter has been changed due to the retry, then a determination is made as to whether the CPB residual bit rate is equal to or greater than a predetermined threshold value (step S162). If the CPB residual bit rate is smaller than the predetermined threshold value, the encoding parameter is maintained as that used for the re-encoding. The encoding parameter restores to an original default encoding parameter only when the CPB residual bit rate is equal to or greater than the predetermined threshold value (step S163). Then, the process returns to step S101 in FIG. 3 in which the encoding of the next encoding-order picture group is carried out.

In the variant illustrated in FIG. 4, the encoding parameter restores to the value at the time of normal encoding only when the CPB residual bit rate exceeds the predetermined amount at a time at which the encoding of the encoding-order picture group is completed as described above. This is for the following reason. If the CPB residual bit rate is small even when the encoding of the encoding-order picture group is completed, restoring of the encoding parameter to the value at the time of normal encoding increases a generated bit rate, and accordingly the CPB underflow is highly likely to occur in encoding of the next encoding-order picture group. In the process of FIG. 4, if the CPB residual bit rate is small, the encoding parameter is not changed such that occurrence of the re-encoding is suppressed in encoding of the next encoding-order picture group and a calculation amount is further reduced, as compared to the process of FIG. 3.

In the present embodiment, the encoding parameter is changed at the time of re-encoding, as described above. Here, a pre-filter is applied to the input video at the time of encoding and the encoding parameters to be changed are a quantization parameter and pre-filter strength. Both of the encoding parameters may be changed or any one of them may be changed.

For the quantization parameter, a predetermined offset value is added to the quantization parameter value at the time of normal encoding and re-encoding is performed using greater quantization parameter.

For the pre-filter, a Gaussian filter is used in the present embodiment. The Gaussian filter can be produced by sampling a Gaussian distribution shown in the following equation with respect to x and y.

$$g(x,y) = \{1/(2\pi\sigma^2)\} \times \exp\{-(x^2+y^2)/(2\sigma^2)\} \quad (1)$$

As can be seen from the above equation, a blurring degree increases as a value of σ increases. Since a high frequency component is reduced as the blurring degree increases, the generated bit rate at the time of encoding is reduced. Details of the Gaussian filter are described, for example, in the following Reference Document 1. [Reference Document 1]: Okutomi, Ozawa, Shimizu, and Hori, "Digital Image Processing," Corporation Picture Information Education Advancement Association, 2006, pp. 108-110.

When σ is equal to 0, the Gaussian filter is not applied, and for example, a default encoding parameter $\sigma_0=0$ and the encoding parameter for re-encoding $\sigma_1>0$. Further, in the present embodiment, a type of low pass filter does not matter. Further, how the blurring degree is strengthened at the time of re-encoding may be arbitrarily determined in advance. For example, the default encoding parameter $\sigma_1$ is changed according to degree of complexity of each picture and $\sigma_1$ is a result of addition of a predetermined offset to $\sigma_0$.

Figure 5:
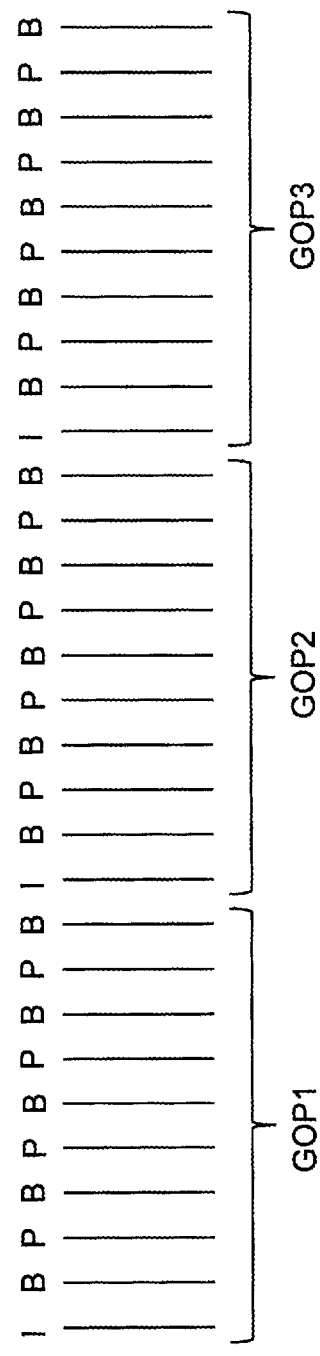
FIG. 5 is a conceptual diagram of a GOP.

Encoding is performed according to the standard of H.264. Further, in the present embodiment, the encoding-order picture group is a GOP, and a conceptual diagram of the GOP when encoded is illustrated in FIG. 5. One GOP includes 10 pictures, and B pictures and P pictures are alternately lined up in display order, with an I picture being a first picture.

Figure 6:
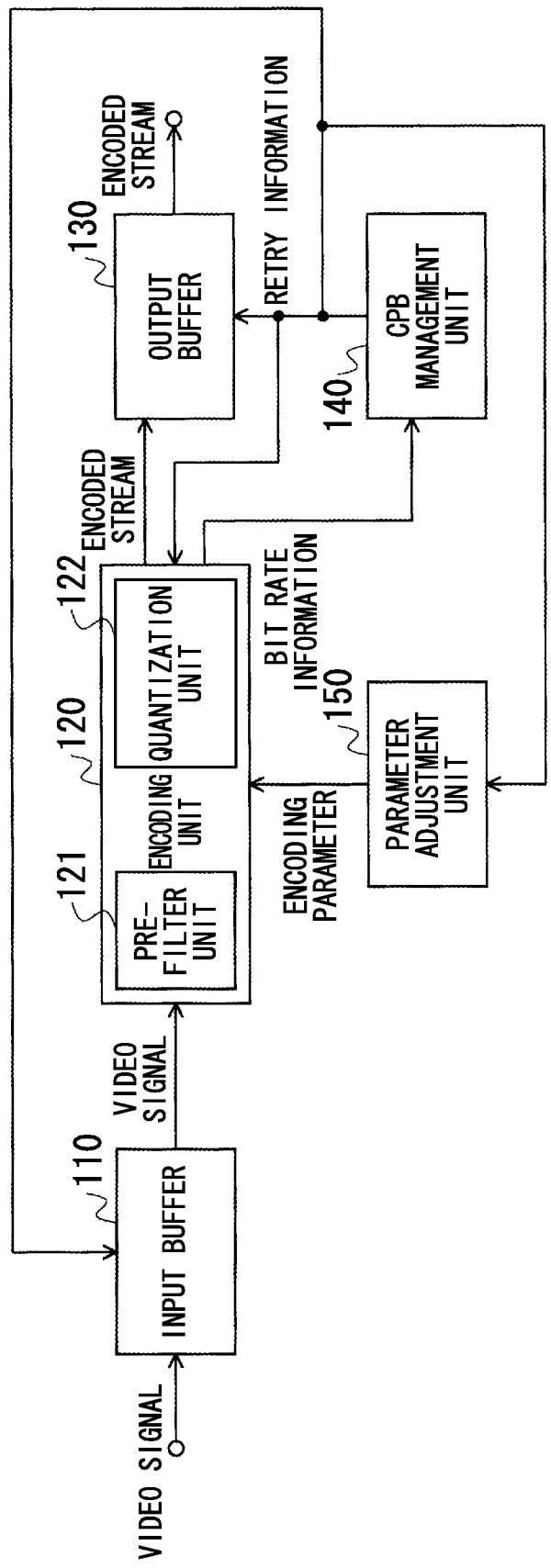
FIG. 6 is a block diagram illustrating a video encoding apparatus according to the first embodiment of the present invention.

An example of an apparatus configuration of the first embodiment of the present invention is illustrated in FIG. 6. An input buffer 110 stores an input video signal and outputs a video signal that is an encoding target to an encoding unit 120. Further, when the input buffer 110 receives information indicating that re-encoding is to be performed due to occurrence of CPB underflow (retry information), from a CPB management unit 140, which will be described below, the input buffer 110 outputs the video signal from a first picture in the GOP that is being encoded to the encoding unit 120 again. Further, when the GOP encoding is completed without reception of the retry information, the input buffer 110 discards the stored video signal of the GOP.

The encoding unit 120 encodes the video signal input from the input buffer 110 and outputs a encoded stream to the output buffer 130. Further, the encoding unit 120 outputs a bit rate (bit rate information) generated when having encoded the input video signal to the CPB management unit 140. Further, when the encoding unit 120 receives the retry information from the CPB management unit 140, the video signal from the first picture in the GOP that is being encoded is input from the input buffer 110 again and an encoding parameter for re-encoding is input from a parameter adjustment unit 150. Accordingly, the encoding unit 120 performs re-encoding using the input encoding parameter for re-encoding.

The output buffer 130 outputs the encoded streams of the GOP in a step in which the encoded streams of the GOP have all been stored, and discards the stored encoded streams of the GOP that is being encoded when the retry information is received from the CPB management unit 140.

Figure 1:
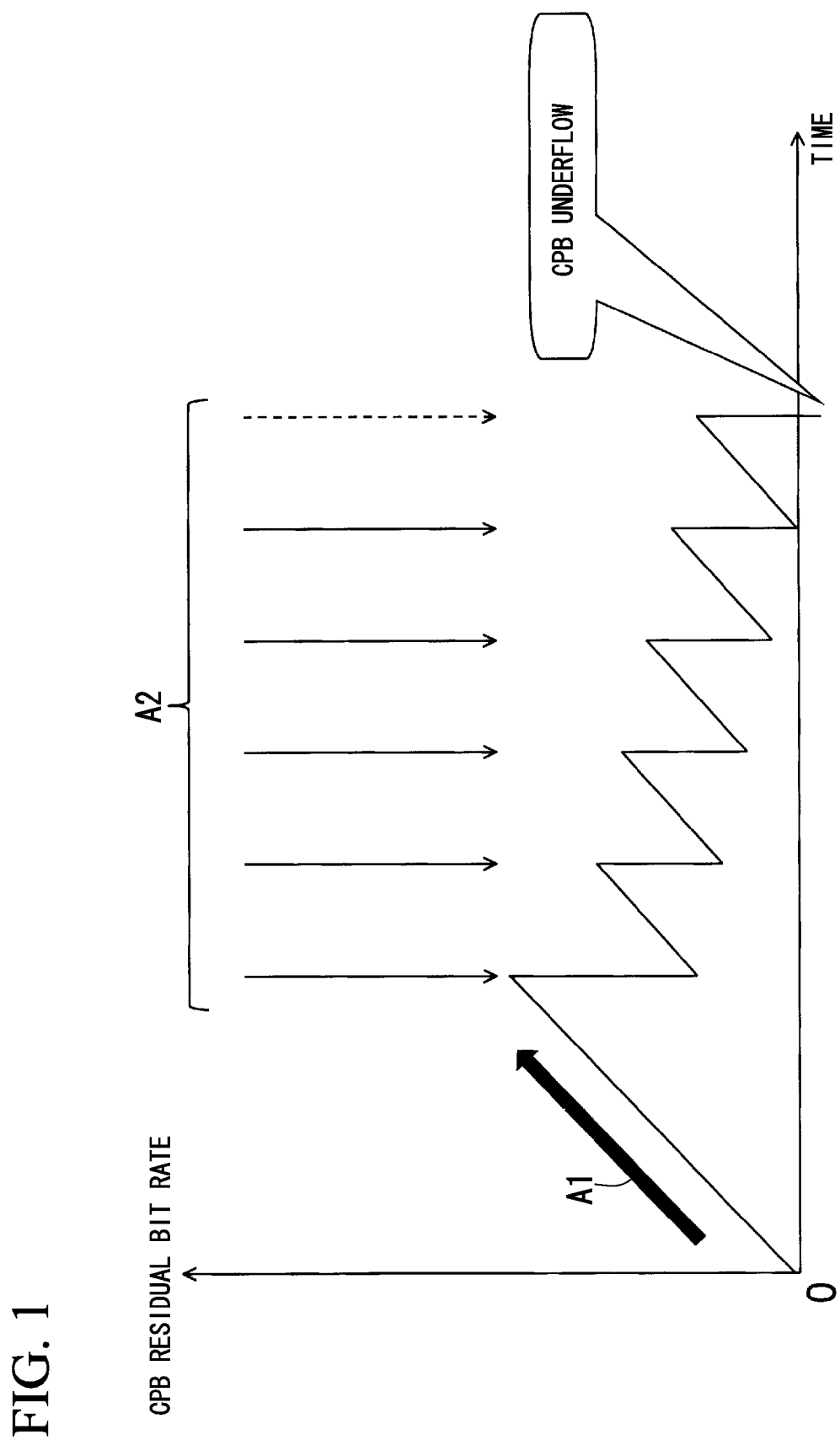
FIG. 1 is a graph illustrating CPB underflow.
Figure 2A:
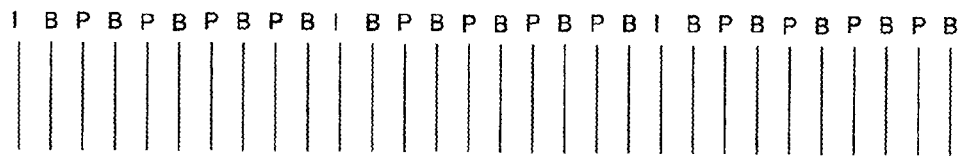
FIG. 2A is a conceptual diagram illustrating pictures in an encoding order.
Figure 2B:
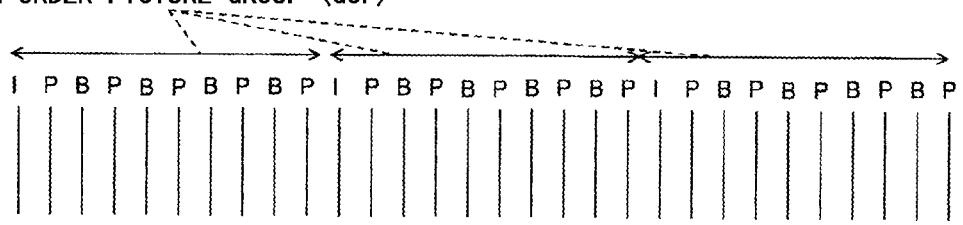
FIG. 2B is a conceptual diagram illustrating an encoding-order picture group when it is a GOP.
Figure 2C:
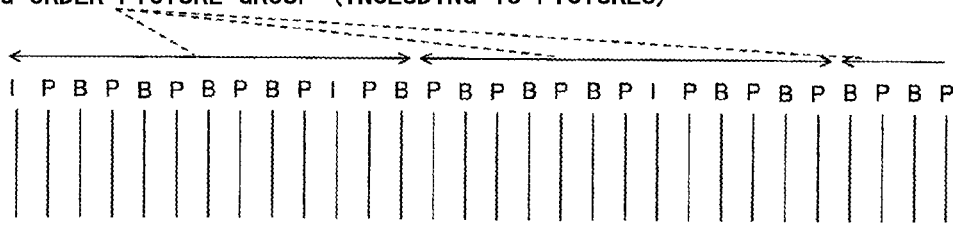
FIG. 2C is a conceptual diagram illustrating an encoding-order picture group when it includes 13 pictures.
Figure 2D:
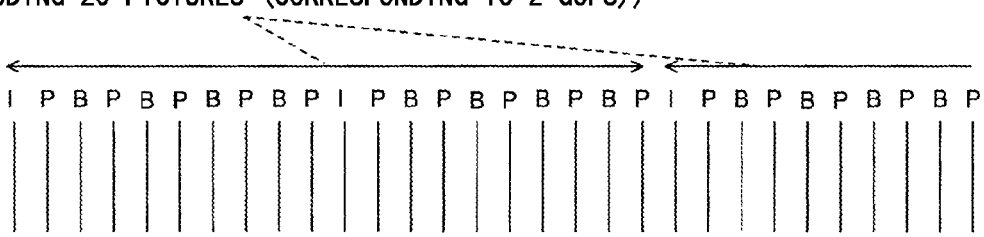
FIG. 2D is a conceptual diagram illustrating an encoding-order picture group when it includes 20 pictures corresponding to two GOPs.

The CPB management unit 140 obtains the CPB residual bit rate changed over time using the bit rate information input from the encoding unit 120. In other words, the CPB management unit 140 obtains the CPB residual bit rate illustrated in the conceptual diagram of FIG. 1. When the CPB underflow occurs, the CPB management unit 140 outputs the retry information to the input buffer 110, the encoding unit 120, the parameter adjustment unit 150, and the output buffer 130 to signal that CPB underflow has occurred.

When the parameter adjustment unit 150 receives the retry information from the CPB management unit 140, the parameter adjustment unit 150 inputs the encoding parameter for re-encoding to the encoding unit 120 as described above. Accordingly, the encoding unit 120 performs the encoding of the same GOP using the encoding parameter with which a generated bit rate decreases, at the time of re-encoding.

A flow of the encoding process in the present embodiment will be described with reference to the flowchart of FIG. 3. Hereinafter, correspondence of the flowchart of FIG. 3 is described as S101, S102, . . . , and so on.

The following three cases of a process of encoding a certain GOP will be described.

[Case 1]: The CPB underflow has not occurred in encoding of the GOP.
[Case 2]: CPB underflow has occurred in encoding of the GOP and could be avoided in re-encoding.
[Case 3]: The CPB underflow has occurred in encoding of the GOP and could not be avoided even in re-encoding.

[Process Example of Case 1]

First, case 1 in which the CPB underflow has not occurred in encoding of the GOP will be described. When the picture of the GOP is input to the input buffer 110, the input buffer 110 stores the picture and inputs the picture as an encoding target picture to the encoding unit 120 (S101). Also, the encoding unit 120 encodes the picture, outputs an encoded stream to the output buffer 130 (the output buffer 130 stores the encoded stream instead of outputting the encoded stream), and outputs bit rate information about the picture to the CPB management unit 140 (S102).

Here, a default encoding parameter is used for encoding, and a filtering process in the pre-filter unit 121 is applied to the encoding target picture with pre-filter strength corresponding to the default encoding parameter, and a DCT (Discrete Cosine Transform) coefficient generated in the present picture is quantized by a quantization unit 122 using the quantization parameter according to the default encoding parameter.

The CPB management unit 140 calculates a CPB residual bit rate for the picture based on the bit rate information input from the encoding unit 120. In this example, since the CPB underflow has not occurred, the CPB management unit 140 does not output retry information (S103). When the encoding target picture is a last picture of the input video signal, the output buffer 130 outputs the stored encoded stream, and the encoding process is completed (S104). Alternatively, if the encoding target picture is the last picture of the GOP, the output buffer 130 outputs the stored encoded stream, the input buffer 110 discards the stored picture, and the process proceeds to the process of encoding a first picture in a next GOP (S105). Here, since re-encoding does not occur in the GOP, the encoding parameter is not changed and the process proceeds to the process of encoding the first picture in the next GOP (S106).

[Process Example of Case 2]

Next, case 2 in which the CPB underflow has occurred in encoding of the GOP and could be avoided in re-encoding will be described. When the picture of the GOP is input to the input buffer 110, the input buffer 110 stores the picture and inputs the picture as an encoding target picture to the encoding unit 120 (S101). Also, the encoding unit 120 encodes the picture, outputs an encoded stream to the output buffer 130 (the output buffer 130 stores the encoded stream instead of outputting the encoded stream), and outputs bit rate information about the picture to the CPB management unit 140 (S102). Here, a default encoding parameter is used in the encoding.

The CPB management unit 140 calculates a CPB residual bit rate for the picture based on the bit rate information input from the encoding unit 120. As a result, when the CPB management unit 140 detects the CPB underflow for the picture, the CPB management unit 140 outputs retry information to the encoding unit 120, the parameter adjustment unit 150, the input buffer 110, and the output buffer 130 (S103).

When the retry has not yet occurred for the GOP that is being encoded (S107), the input buffer 110 outputs a first picture of the stored GOP that is being encoded to the encoding unit 120 (S108) and the parameter adjustment unit 150 outputs the encoding parameter for re-encoding to the encoding unit 120 (S109). Further, the output buffer 130 discards the encoded stream of the GOP that is being encoded. Also, the encoding unit 120 encodes the first picture in the input GOP using the encoding parameter for re-encoding.

Here, the encoding parameter for re-encoding is used in the encoding, a pre-filtering process in the pre-filter unit 121 is applied to the encoding target picture with pre-filter strength corresponding to the encoding parameter for re-encoding (a blurring degree is greater than the default encoding parameter), and a DCT coefficient generated in the present picture is quantized by the quantization unit 122 using the quantization parameter according to the encoding parameter for re-encoding (the quantization step size is greater than the default encoding parameter).

Then, the pictures of the GOP are sequentially input from the input buffer 110 to the encoding unit 120 and the encoding process is performed by the encoding unit 120 only when the CPB underflow does not occur. Also, when encoding of the last picture of the GOP is completed (S105), an encoded stream of the GOP is output from the output buffer 130, the encoding unit 120 sets the encoding parameter to the default encoding parameter (S106), and the process proceeds to encoding of a next GOP process. Further, an operation when encoding of the last picture of the input video is completed is similar to that in case 1 described above.

Figure 7:
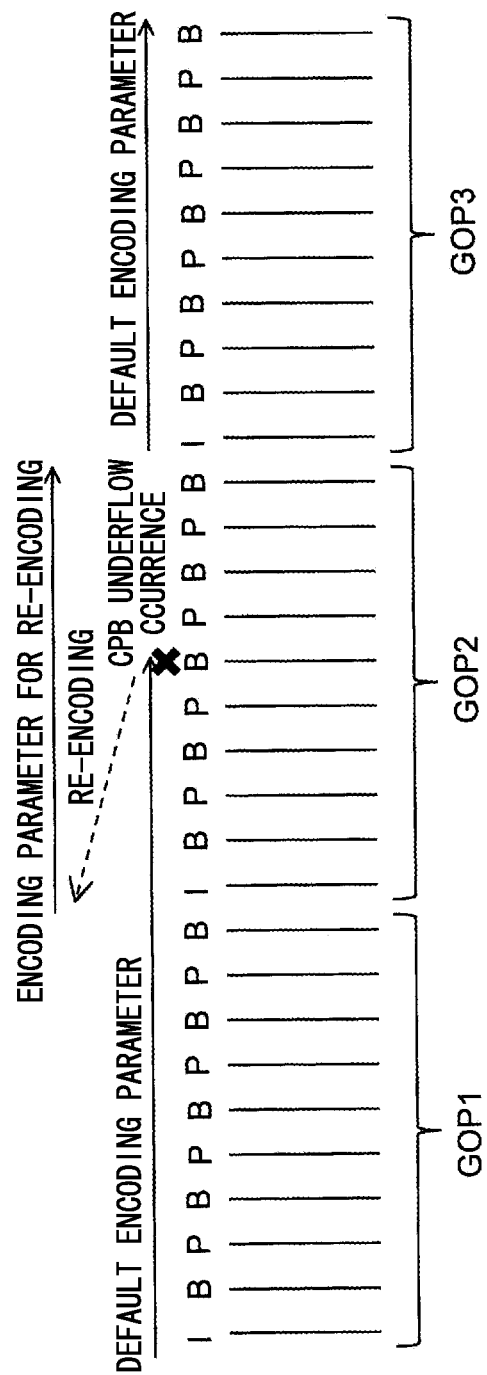
FIG. 7 is a conceptual diagram of a change in an encoding parameter when re-encoding is performed according to the embodiment of the present invention.

A conceptual diagram of a change in the encoding parameter when re-encoding is performed is illustrated in FIG. 7. In the example of FIG. 7, since the CPB underflow occurs in encoding a sixth picture of second GOP2, the encoding parameter for re-encoding to suppress a generated bit rate is set and GOP2 is re-encoded from its first I picture. Then, since the occurrence of the CPB underflow due to the re-encoding is inhibited, the encoding parameter for re-encoding restores to the default encoding parameter in encoding next GOP3 and the encoding process is continued.

Figure 8:
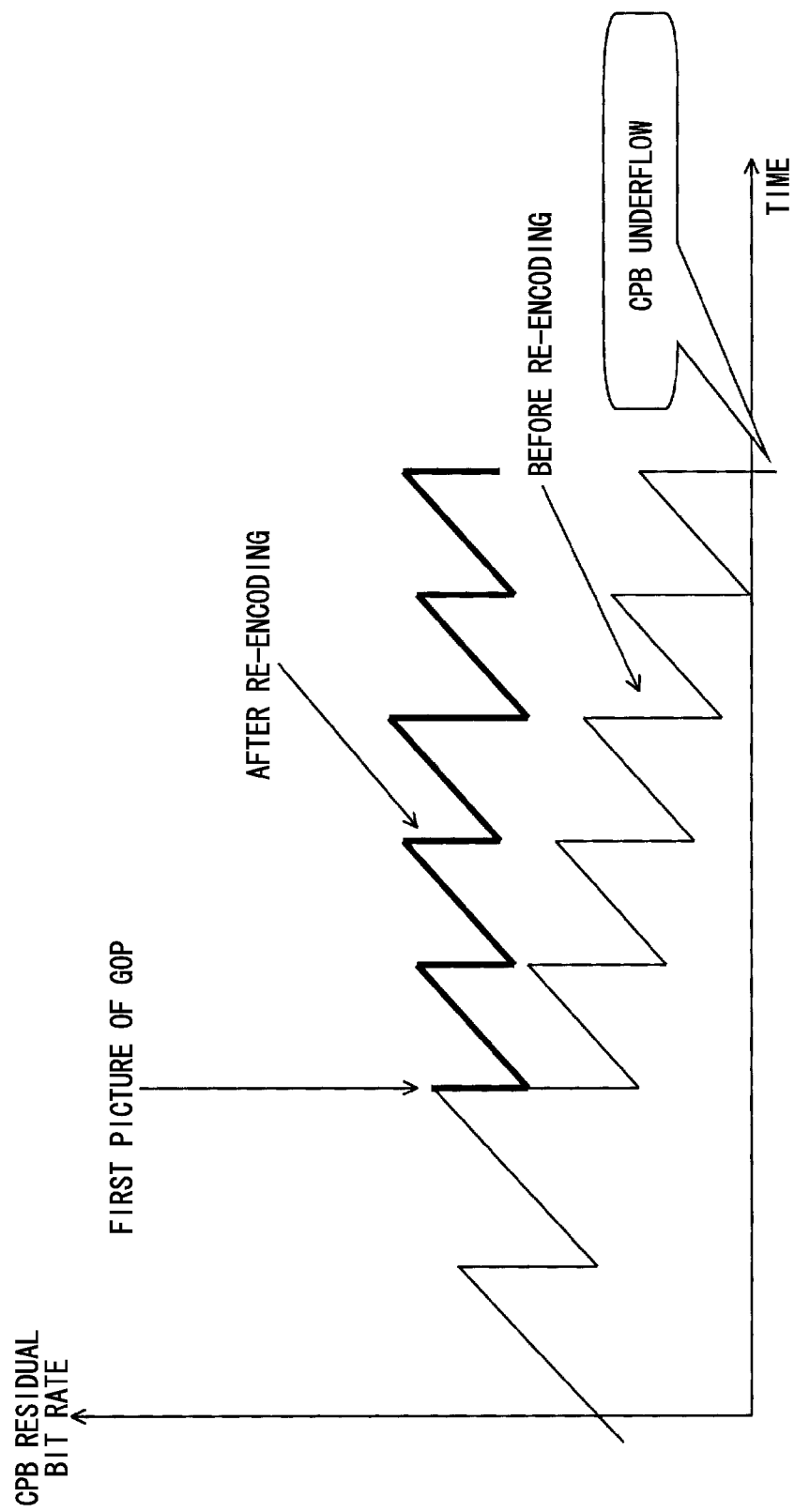
FIG. 8 is a graph illustrating a transition of a CPB residual bit rate when re-encoding is performed according to the embodiment of the present invention.

A conceptual diagram of a transition of the CPB residual bit rate when the re-encoding is performed is illustrated in FIG. 8. A line indicated by a bold line is a CPB residual bit rate after re-encoding. In re-encoding, since a blurring degree is strengthened by a pre-filter and the quantization parameter is greater than the default encoding parameter, a generated bit rate is suppressed, and the transition as illustrated, for example, in FIG. 8 occurs and the CPB underflow is suppressed.

[Process Example of Case 3]

Lastly, case 3 in which CPB underflow has occurred in encoding of the GOP and could not be avoided even in re-encoding will be described. In this case, an operation in which the CPB management unit 140 detects the CPB underflow and re-encoding of the GOP is performed is similar to that in case 2. When the CPB underflow occurs during re-encoding of the GOP, re-encoding is completed (S107). Further, the encoding may not be completed and frame dropping may be allowed so that encoded data of the picture in which the CPB underflow has occurred is discarded without completing encoding and a next picture is encoded.

Second Embodiment

Figure 9:
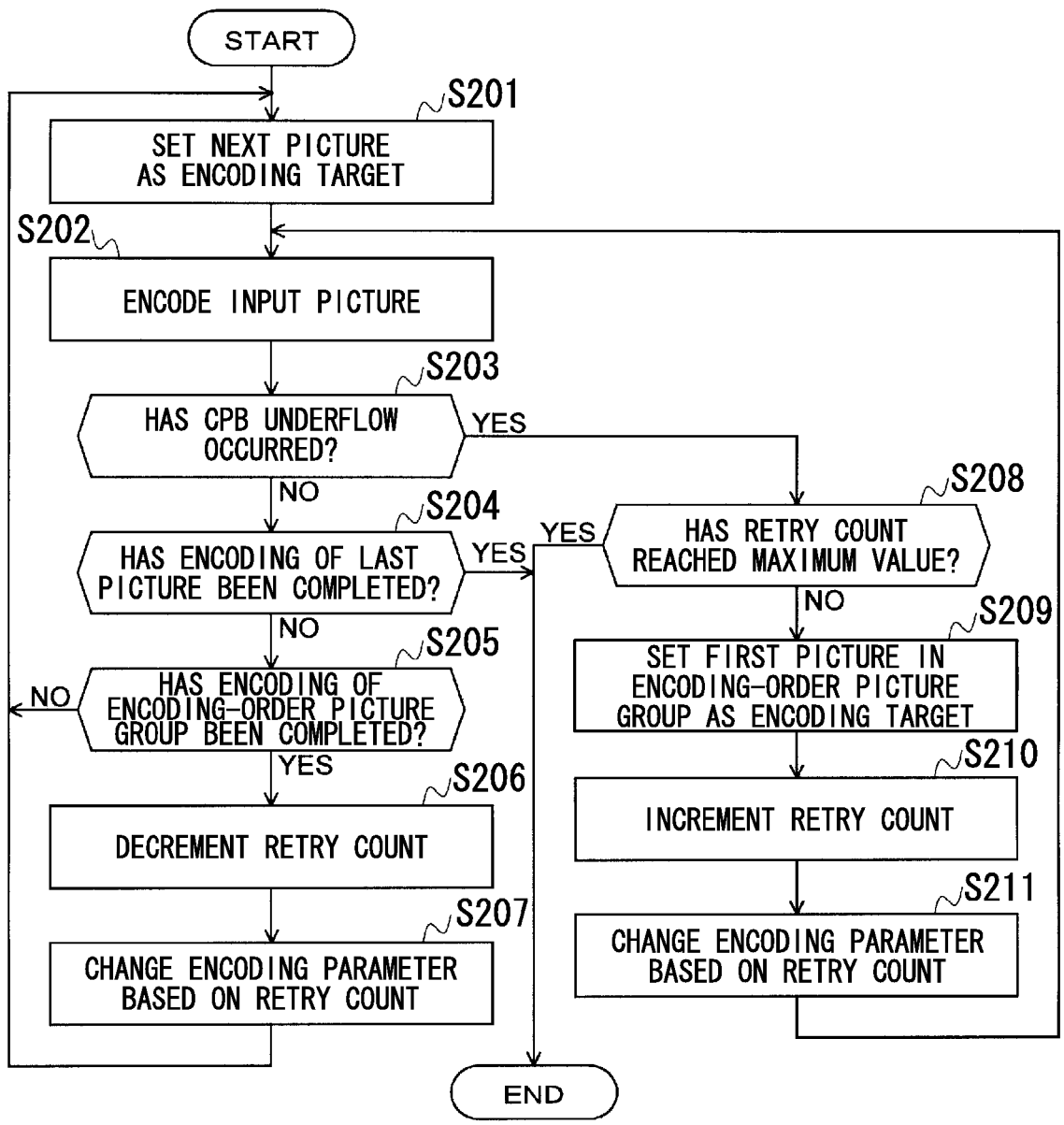
FIG. 9 is a flowchart of a video encoding control method according to a second embodiment of the present invention.

Hereinafter, a second embodiment of the present invention will be described. FIG. 9 is a process flowchart illustrating a video encoding control method according to the second embodiment of the present embodiment.

First, a picture next to a picture for which encoding has ended in an input video signal is set as an encoding target (step S201). The input picture set as the encoding target is encoded using H.264 or any of other predetermined encoding schemes (step S202). A determination is made as to whether CPB underflow occurs due to encoding of the input picture (step S203). If the CPB underflow occurs, the process proceeds to step S208. Further, a determination may be made as to whether the CPB underflow has occurred, for example, using a method used in the H.264 standard.

When the CPB underflow does not occur, a determination is made as to whether encoding of a last picture is completed (step S204). If the encoding of the last picture is completed, the encoding process ends.

Otherwise, a determination is made as to whether encoding of the encoding-order picture group is completed (step S205). If the encoding of the encoding-order picture group is not completed, the process returns to step S201 in which the encoding process continues to be similarly performed on a next picture. If the encoding of the encoding-order picture group is completed and if a retry count is 1 or greater, the retry count is decremented by 1 (step S206). Further, the initial value of the retry count is 0. Then, the encoding parameter determined according to the retry count in advance is set based on the retry count (step S207), and the process returns to step S201 in which the encoding process is performed from a first picture of a next encoding-order picture group.

If it is detected in step S203 that the CPB underflow occurs, a determination is made as to whether the value of the current retry count has reached a predetermined maximum value (step S208). When the retry count is the maximum value, the CPB underflow could not be avoided even when the encoding-order picture group is re-encoded. Accordingly, encoding ends.

When the retry count has not reached the maximum value, a first picture in the current encoding-order picture group is set as the encoding target to re-encode the current encoding-order picture group (step S209). Also, the retry count is incremented by 1 (step S210). Then, one or both of two encoding parameters (the quantization parameter and the pre-filter strength) are changed based on the retry count (for the quantization parameter, a step size is changed to be greater, and for the filter strength, a blurring degree is changed to be greater) (step S211). The process returns to step S202 in which the encoding-order picture group that is being encoded is re-encoded.

In the present invention, basically, one encoding process is performed, and the encoding-order picture group (e.g., the GOP) is repetitively encoded while suppressing a generated bit rate in a stepwise manner until the CPB underflow does not occur only when the CPB underflow has occurred, unlike related art b in which all frames of the input video are encoded twice. At the time of second and subsequent encoding, the encoding is performed with an encoding parameter for suppressing the CPB underflow, which is determined according to the retry count. Accordingly, the calculation amount can be reduced and degradation of video quality due to re-encoding can be reduced, as compared to related art b in which all pictures of the input video are encoded twice.

As described above, in the present embodiment, the encoding parameters are changed according to the retry count at the time of re-encoding. Here, a pre-filter is applied to an input video at the time of encoding, and the encoding parameters to be changed are a quantization parameter and pre-filter strength. Both of the two encoding parameters may be changed or only any one of them may be changed.

For the quantization parameter, a predetermined offset value increasing in a stepwise manner according to the retry count is added to the quantization parameter value determined at the time of normal encoding, and re-encoding is performed using such a greater quantization parameter.

For the pre-filter, a Gaussian filter is used in the present embodiment. The Gaussian filter can be produced by sampling a Gaussian distribution shown in Equation (1) described above with respect to x and y.

In Equation (1), when σ is equal to 0, the Gaussian filter is not applied and, for example, a default encoding parameter $\sigma=0$, and the encoding parameter for re-encoding is $\sigma_c$ if the value of the retry count is c. $\sigma_c$ has a great value as a value of c is larger. $0 < \sigma_1 < \sigma_2 < \ldots$ . Further, a type of low pass filter does not matter in the present embodiment. Further, for example, the default encoding parameter $\sigma_0$ may be changed according to the degree of complexity of each picture, and $\sigma_c$ may be obtained by adding a predetermined offset to $\sigma_{c-1}$.

In an embodiment that will be described below, encoding according to the standard of H.264 as an encoding scheme is performed. Further, the encoding-order picture group is a GOP. A conceptual diagram of the GOP when encoded is as illustrated in FIG. 5. One GOP includes 10 pictures, and B pictures and P pictures are alternately lined up in a display order, with an I picture being a first picture, as in the first embodiment.

Figure 10:
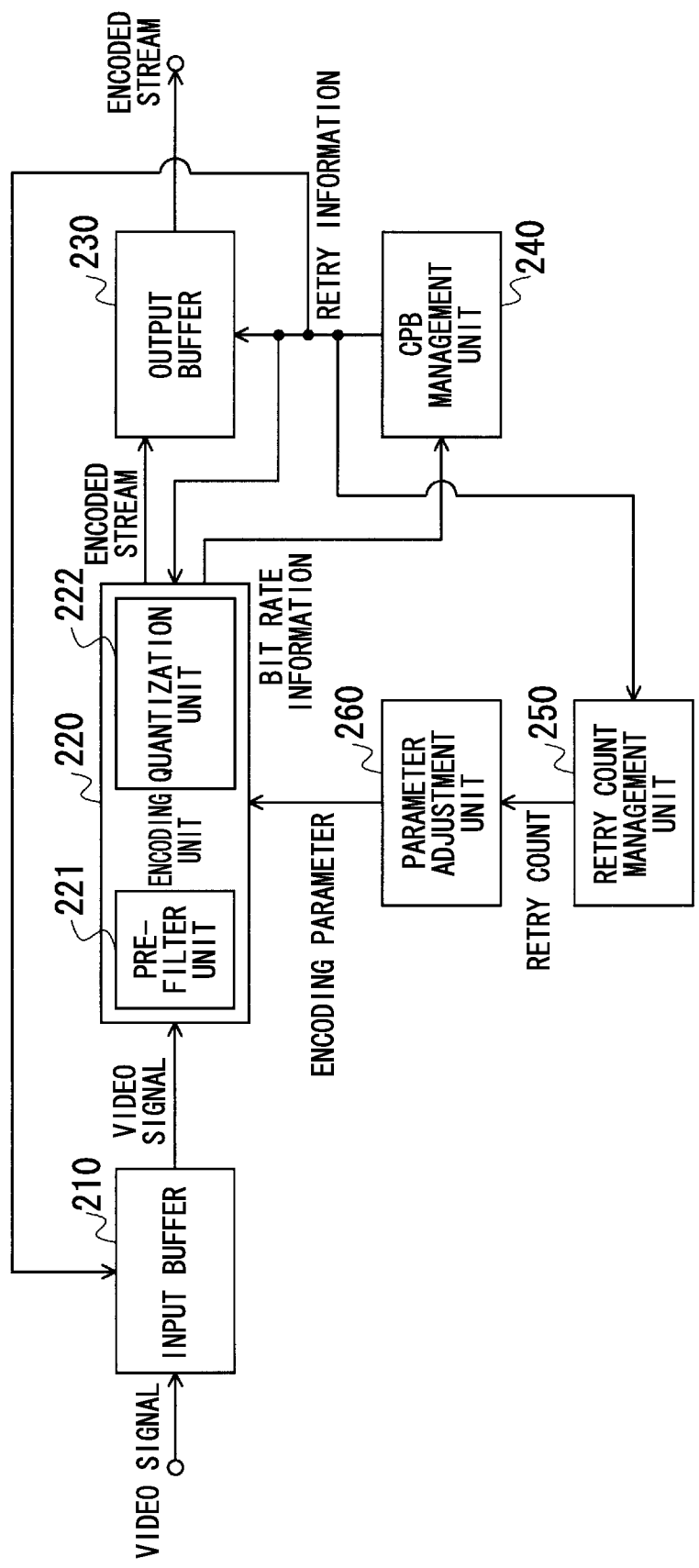
FIG. 10 is a block diagram illustrating a video encoding apparatus according to the second embodiment of the present invention.

An example of an apparatus configuration of the second embodiment of the present invention is illustrated in FIG. 10. An input buffer 210 stores an input video signal and outputs a video signal as an encoding target to an encoding unit 220.

Further, when the input buffer 210 receives information indicating that re-encoding is to be performed due to occurrence of the CPB underflow (retry information) from a CPB management unit 240, which will be described below, the input buffer 210 outputs the video signal from the first picture in the GOP that is being encoded, to the encoding unit 220 again. Further, when the GOP encoding is completed without reception of the retry information, the input buffer 210 discards the stored video signal of the GOP.

The encoding unit 220 encodes the video signal input from the input buffer 210 and outputs an encoded stream to the output buffer 230. Further, the encoding unit 220 outputs a bit rate (bit rate information) of each macro block generated when having encoded the input video signal to the CPB management unit 240. Further, when the encoding unit 220 receives the retry information from the CPB management unit 240, the video signal from the first picture in the GOP that is being encoded is input from the input buffer 210 to the encoding unit 220 again and the encoding parameter for re-encoding is input from the parameter adjustment unit 260 to the encoding unit 220. Accordingly, the encoding unit 220 performs re-encoding using the input encoding parameter for re-encoding.

In a step in which the encoded streams of the GOP have all been stored, the output buffer 230 outputs the encoded stream of the GOP, and when the retry information is received from the CPB management unit 240, the output buffer 230 discards the stored encoded streams of the GOP that is being encoded.

The CPB management unit 240 obtains a residual bit rate of the CPB changed over time using the bit rate information input from the encoding unit 220. In other words, the CPB management unit 240 obtains the residual bit rate of the CPB illustrated in the conceptual diagram of FIG. 1. Also, when the CPB underflow occurs, the CPB management unit 240 outputs the retry information to the input buffer 210, the encoding unit 220, the retry count management unit 250, and the output buffer 230 to signal that the CPB underflow has occurred.

When the retry count management unit 250 receives the retry information from the CPB management unit 240, the retry count management unit 250 adds 1 to the value of the current retry count and notifies the parameter adjustment unit 260 of the updated retry count. Further, when encoding of the GOP that is currently being encoded is completed without reception of the retry information from the CPB management unit 240 and the value of the retry count is greater than or equal to 1, the retry count management unit 250 subtracts 1 from the value of the retry count and notifies the parameter adjustment unit 260 of the retry count. When encoding of the GOP is completed and the value of the retry count is 0, the retry count management unit 250 notifies the parameter adjustment unit 260 of the retry count of 0.

When the parameter adjustment unit 260 receives the retry count from the retry count management unit 250, the parameter adjustment unit 260 inputs the encoding parameter determined according to the retry count to the encoding unit 220. Accordingly, the encoding unit 220 performs encoding of the same GOP using the encoding parameter with which a generated bit rate decreases as the number of re-encoding repetitions increases.

As described above, in the present embodiment, a concept of the retry count whose value increases when re-encoding occurs and decreases at a time at which the GOP encoding is completed is introduced, and the retry count management unit 250 manages the retry count. This retry count has a predetermined upper limit value such as "3," and re-encoding of the same GOP may be performed until the retry count reaches the upper limit value. An offset value of the quantization parameter and the filter strength of the pre-filter at the time of encoding are changed according to the value of the retry count.

When the retry count is 0, a default encoding parameter is used. When the retry count is not 0 and, for example, the upper limit value of the retry count is 3, the encoding parameters for re-encoding corresponding to the retry counts 1, 2 and 3 may be prepared as an encoding parameter table in advance, and the encoding parameter obtained from the encoding parameter table may be used for re-encoding.

A flow of an encoding process in the present embodiment will be described with reference to the flowchart in FIG. 9. Hereinafter, correspondence to the flowchart of FIG. 9 is described as S201, S202, . . . , and so on.

The following three cases of a process of encoding a certain GOP will be described.

[Case 1]: The CPB underflow has not occurred in encoding of the GOP.

[Case 2]: The CPB underflow has occurred multiple times in encoding of the GOP and could be avoided in re-encoding.

[Case 3]: The CPB underflow has occurred multiple times in encoding of the GOP and the retry count has reached the upper limit value, and the CPB underflow could not be avoided even in re-encoding.

[Process Example of Case 1]

First, case 1 in which the CPB underflow has not occurred in encoding of the GOP will be described. When the picture of the GOP is input to the input buffer 210, the input buffer 210 stores the picture and inputs the picture as an encoding target picture to the encoding unit 220 (S201). Also, the encoding unit 220 encodes the picture, outputs an encoded stream to the output buffer 230 (the output buffer 230 stores the encoded stream instead of outputting the encoded stream), and outputs bit rate information about the picture to the CPB management unit 240 (S202).

Here, for example, if the retry count is assumed to have an initial value of 0, a default encoding parameter is used for encoding, and a filtering process of the pre-filter unit 221 is applied to the encoding target picture with pre-filter strength corresponding to the default encoding parameter. A DCT coefficient generated in the present picture is quantized by the quantization unit 222 using the quantization parameter according to the default encoding parameter. When the retry count is 1 or greater, encoding is performed using a pre-filtering and quantization process based on the filter strength and the quantization parameter determined according to the retry count.

The CPB management unit 240 calculates a CPB residual bit rate for the picture based on the bit rate information input from the encoding unit 220. In this example, since the CPB underflow has not occurred, the CPB management unit 240 does not output retry information (S203). When the encoding target picture is a last picture in the input video signal, the output buffer 230 outputs stored encoded streams, and the encoding process is completed (S204). Alternatively, if the encoding target picture is the last picture of the GOP, the output buffer 230 outputs the stored encoded streams, the input buffer 210 discards the stored picture, and the process proceeds to an encoding process of a first picture in a next GOP (S205 to S207).

When the GOP encoding is completed without occurrence of the CPB underflow as in case 1, the retry count management unit 250 decrements the value of the current retry count by 1 except for a case in which the retry count is 0 (S206). When re-encoding occurs in a GOP earlier than a GOP for which encoding is currently completed, the retry count may not be 0. The retry count management unit 250 notifies the parameter adjustment unit 260 of the changed retry count, and the parameter adjustment unit 260 sets, in the encoding unit 220, the encoding parameter according to the notified retry count. Encoding of a first picture of a next GOP starts.

[Process Example of Case 2]

Next, case 2 in which the CPB underflow has occurred multiple times in encoding of the GOP and could be avoided in re-encoding will be described. A case in which the retry count at a time at which the GOP encoding starts is assumed to be 1 and re-encoding is performed twice in the same GOP will be described herein.

When the picture of the GOP is input to the input buffer 210, the input buffer 210 stores the picture and inputs the picture as an encoding target picture to the encoding unit 220 (S201). Also, the encoding unit 220 encodes the picture, outputs an encoded stream to the output buffer 230 (the output buffer 230 stores the encoded stream instead of outputting the encoded stream), and outputs bit rate information about the picture to the CPB management unit 240 (S202). Here, an encoding parameter corresponding to the retry count of 1 is used for encoding.

The CPB management unit 240 calculates a CPB residual bit rate for the picture based on the bit rate information input from the encoding unit 220. As a result, when the CPB management unit 240 detects the CPB underflow for the picture, the CPB management unit 240 outputs the retry information to the encoding unit 220, the retry count management unit 250, the input buffer 210, and the output buffer 230 (S203).

Since the current retry count is 1 and has not reached 3 that is an upper limit value (S208), the input buffer 210 outputs a first picture of the stored GOP that is being encoded to the encoding unit 220 (S209). Meanwhile, the retry count is incremented by 1 by the retry count management unit 250 and the retry count whose value is 2 is output to the parameter adjustment unit 260 (S210).

The parameter adjustment unit 260 reads the encoding parameter when the retry count is 2 from the encoding parameter table and sets the encoding parameter in the encoding unit 220 (S211). The output buffer 230 discards the encoded stream of the GOP that is being encoded.

In the encoding unit 220, the pictures of the GOP are sequentially input from the input buffer 210 and encoding is carried out only when the CPB underflow does not occur. In this encoding, when the CPB underflow occurs again in the same GOP, the retry count is incremented by 1 to be 3 through a process similar to the above-described process. Accordingly, the encoding parameter is changed into an encoding parameter corresponding to the retry count of 3 and then encoding is sequentially performed on the same GOP from its first picture again. In encoding of this GOP, when the CPB underflow has not occurred, the retry count is decremented by 1 by the retry count management unit 250 to be 2 and encoding of a next GOP is carried out. In this case, operations of the input buffer 210 and the output buffer 230 are similar to those in the above-described example.

Figure 11:
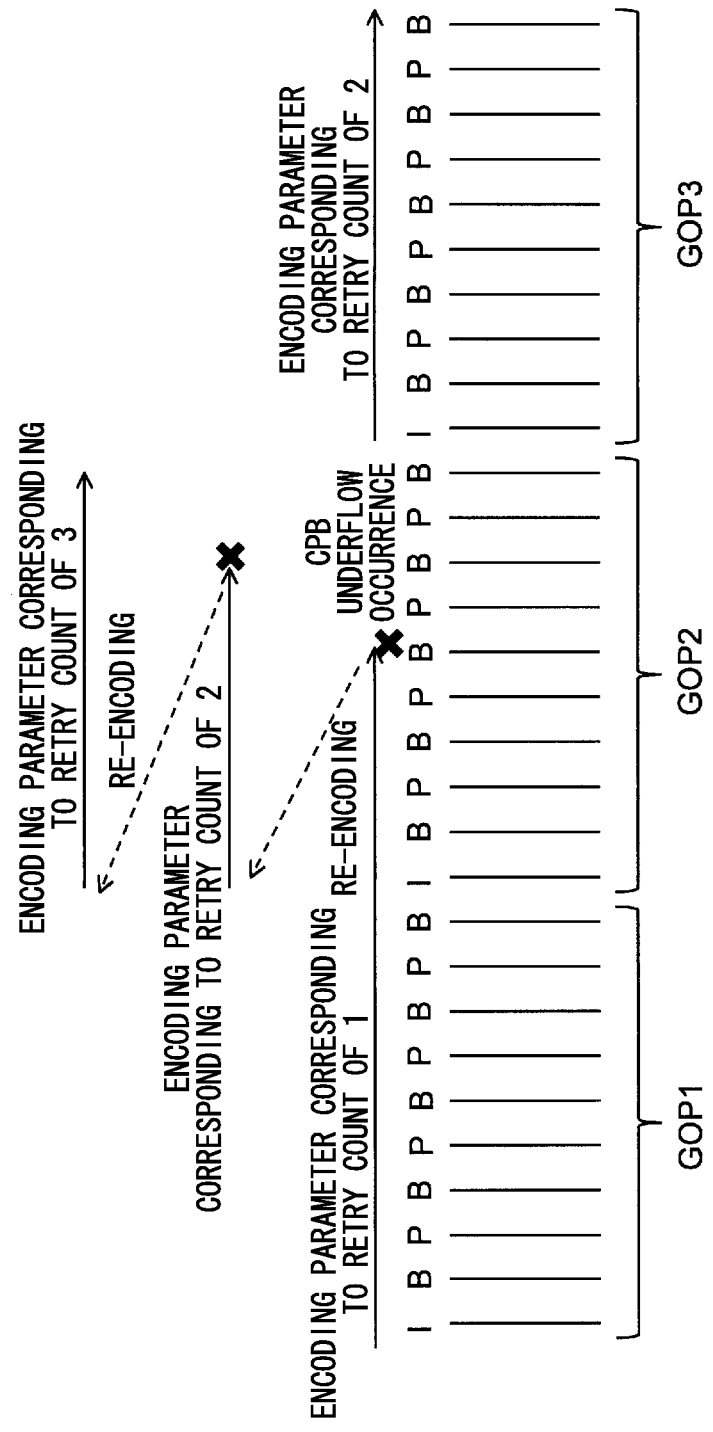
FIG. 11 is a conceptual diagram of a transition of a retry count and an encoding parameter performed according to the embodiment of the present invention.

A conceptual diagram of a transition of the retry count and the encoding parameter in the example of case 2 is illustrated in FIG. 11. In the example of FIG. 11, when the second GOP2 is encoded in a state in which the retry count is 1, the CPB underflow occurs in encoding of a sixth picture. Accordingly, the retry count is set to 2 and GOP2 is re-encoded from its first I picture using the encoding parameter corresponding to the retry count of 2 again. Even in this re-encoding, the CPB underflow occurs in a seventh picture and re-encoding is performed using an encoding parameter corresponding to the retry count of 3 with which a generated bit rate is small. In re-encoding performed again, since the CPB underflow has not occurred, the retry count is decremented by 1 when encoding of GOP2 is completed, and the process proceeds to encoding of next GOP3 using the encoding parameter corresponding to the retry count of 2.

A conceptual diagram of a transition of a CPB residual bit rate when re-encoding is performed is as illustrated in FIG. 8. A line indicated by a bold line is a CPB residual bit rate after re-encoding, as in the first embodiment. In re-encoding, since a blurring degree is strengthened by a pre-filter and the quantization parameter is greater than the default encoding parameter, a generated bit rate is suppressed, the transition as illustrated, for example, in FIG. 8 occurs, and the CPB underflow is suppressed.

[Process Example of Case 3]

Lastly, case 3 in which CPB underflow has occurred multiple times in encoding the same GOP and could not be avoided even in re-encoding will be described. The retry count is assumed to reach 3 during encoding of a certain GOP, similar to case 2. Further, when the CPB management unit 240 detects that the CPB underflow occurs in encoding of the same GOP (S203), the retry count management unit 250 detects that the retry count reaches the upper limit value (S208), and encoding is completed. In this case, encoding may not be completed and frame dropping may be allowed so that encoded data of the picture in which the CPB underflow has occurred is discarded without completing encoding and a next picture is encoded.

Third Embodiment

Figure 12:
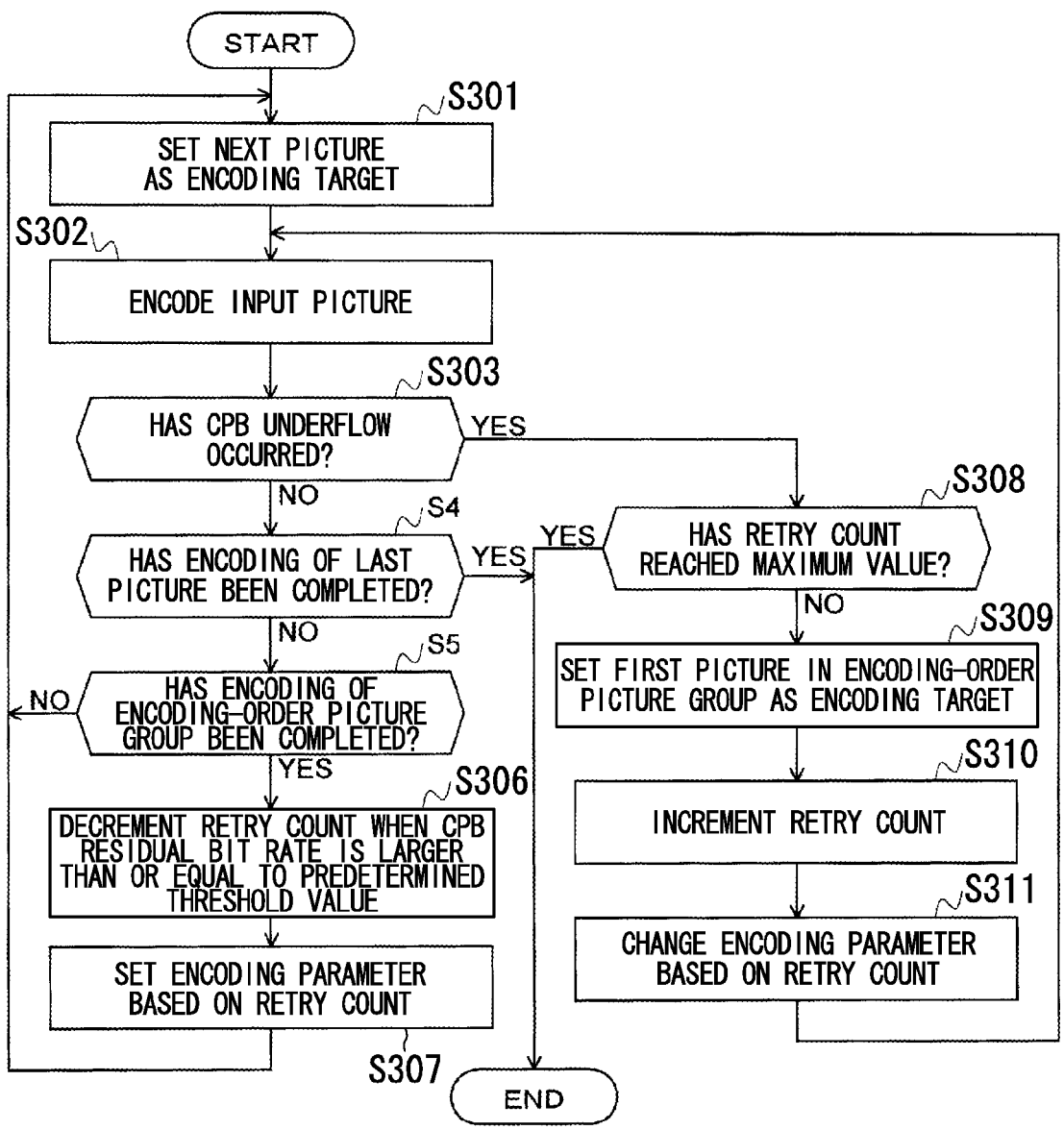
FIG. 12 is a flowchart of a video encoding control method according to a third embodiment of the present invention.

Hereinafter, a third embodiment of the present invention will be described. FIG. 12 is a process flowchart illustrating a video encoding control method according to the third embodiment of the present invention.

First, a picture next to a picture for which encoding has ended in an input video signal is set as an encoding target (step S301). The input picture set as the encoding target is encoded using H.264 or any of other predetermined encoding schemes (step S302). A determination is made as to whether the CPB underflow has occurred (step S303). When the CPB underflow occurs, the process proceeds to step S308. Further, a determination may be made as to whether the CPB underflow has occurred, for example, using a method used in the H.264 standard.

When the CPB underflow has not occurred, a determination is made as to whether encoding of a last picture is completed (step S304). If encoding of the last picture is completed, the encoding process ends.

Otherwise, a determination is made as to whether encoding of the encoding-order picture group is completed (step S305). If the encoding of the encoding-order picture group is not completed, the process returns to step S301 in which the encoding process continues to be similarly performed on a next picture.

When encoding of the encoding-order picture group is completed, a determination is made as to whether the following conditions are satisfied, and the retry count is decremented by 1 only when the conditions are satisfied (step S306).

Condition 1: The retry count is 1 or greater.
Condition 2: The CPB residual bit rate is equal to or greater than a predetermined threshold value.

When the retry count is 0 or when the CPB residual bit rate is smaller than the predetermined threshold value, the retry count is not decremented and remains as the original value.

Then, based on the retry count, the encoding parameter that can be determined according to the retry count in advance is set (step S307), and the process returns to step S301 in which the encoding process is performed from a first picture of a next encoding-order picture group.

When it is detected in step S303 that the CPB underflow occurs, a determination is made as to whether the value of the current retry count has reached a predetermined maximum value (step S308). When the retry count is the maximum value, the CPB underflow could not be avoided even when the encoding-order picture group is re-encoded. Accordingly, encoding ends.

When the retry count has not reached the maximum value, the first picture in the current encoding-order picture group is set as an encoding target in order to re-encode the current encoding-order picture group (step S309). Also, the retry count is incremented by 1 (step S310). Then, based on the retry count, one or both of the two encoding parameters (the quantization parameter and the pre-filter strength) are changed (for the quantization parameter, the step size is changed to be greater, and for the filter strength, the blurring degree is changed to be greater) (step S311), and the process returns to step S302 in which the encoding-order picture group that is being encoded is re-encoded.

In the present invention, basically, one encoding process is performed, and the encoding-order picture group (e.g., the GOP) is repetitively encoded while suppressing a generated bit rate in a stepwise manner until the CPB underflow does not occur only when the CPB underflow has occurred, unlike related art b in which all frames of the input video are encoded twice. At the time of second and subsequent encoding, encoding is performed with an encoding parameter for suppressing the CPB underflow, which is determined according to the retry count. Accordingly, a calculation amount can be reduced and degradation of video quality due to re-encoding can be reduced, as compared to related art b in which all pictures of the input video are encoded twice.

As described above, in the present embodiment, an encoding parameter is changed according to the retry count at the time of re-encoding. Here, at the time of encoding, a pre-filter is applied to the input video, and encoding parameters to be changed are a quantization parameter and pre-filter strength. Both of the two encoding parameters may be changed or only any one of them may be changed.

For the quantization parameter, a predetermined offset value increasing in a stepwise manner according to the retry count is added to the quantization parameter value determined at the time of normal encoding, and re-encoding is performed using such a greater quantization parameter.

For the pre-filter, a Gaussian filter is used in the present embodiment, as in the first embodiment. The Gaussian filter can be produced by sampling a Gaussian distribution shown in Equation (1) described above with respect to x and y.

In Equation (1), when σ is equal to 0, the Gaussian filter is not applied and, for example, a default encoding parameter $\sigma_0=0$ and the encoding parameter for re-encoding is $\sigma_c$ if the value of the retry count is c. $\sigma_c$ has a great value as a value of c is larger. $0<\sigma_1<\sigma_2<\ldots$ . Further, a type of low pass filter does not matter in the present embodiment. Further, for example, the default encoding parameter $\sigma_0$ is changed according to degree of complexity of each picture, and $\sigma_c$ may be obtained by adding a predetermined offset to $\sigma_{c-1}$.

In an embodiment that will be described below, encoding according to the standard of H.264 as an encoding scheme is performed. Further, the encoding-order picture group is a GOP. A conceptual diagram of the GOP when encoded is as illustrated in FIG. 5. One GOP includes 10 pictures, and B pictures and P pictures are alternately lined up in a display order, with an I picture being a first picture, as in the first embodiment.

Figure 13:
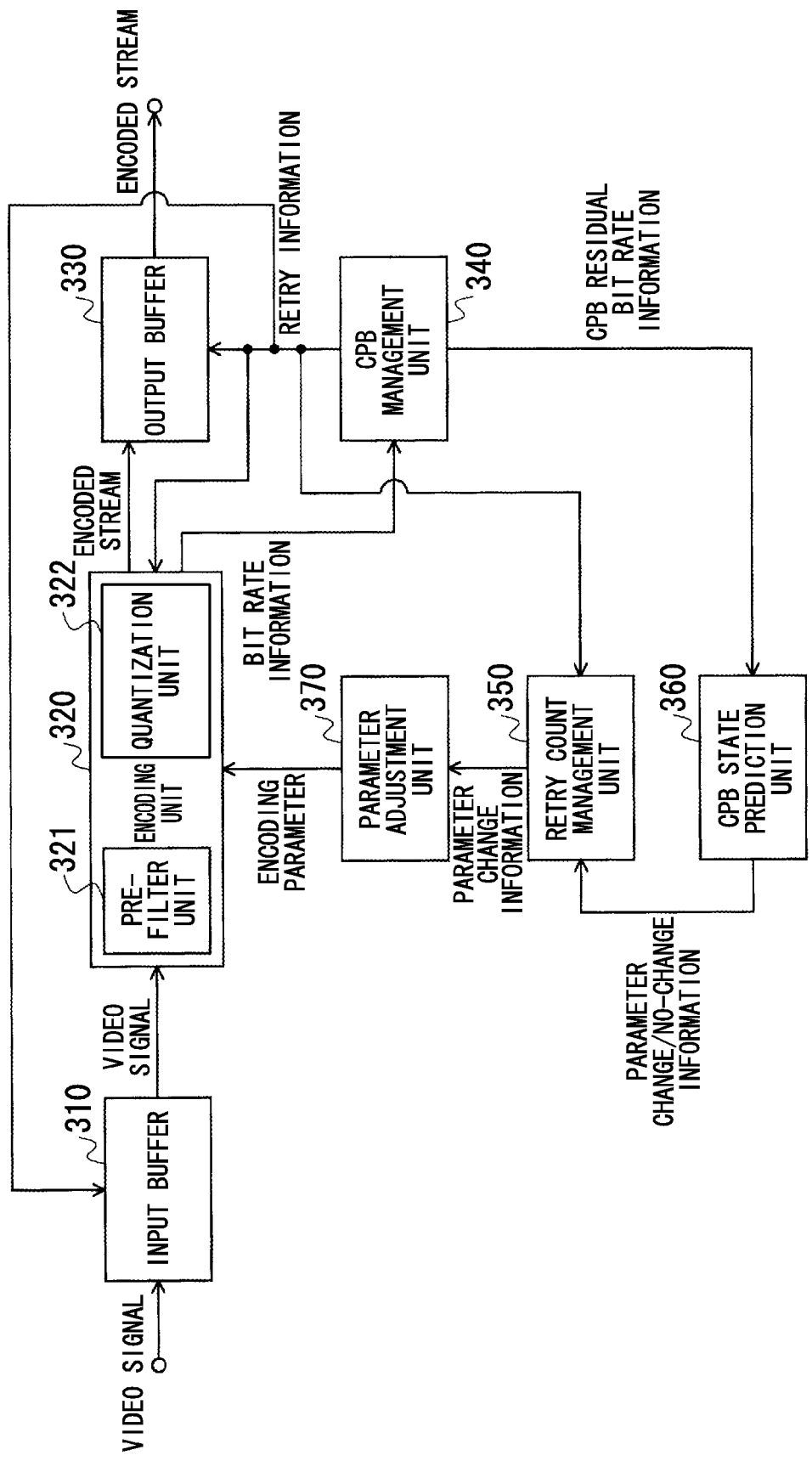
FIG. 13 is a block diagram illustrating a video encoding apparatus according to the third embodiment of the present invention.

An example of an apparatus configuration of the third embodiment of the present invention is illustrated in FIG. 13. An input buffer 310 stores an input video signal and outputs a video signal as an encoding target to an encoding unit 320. Further, when the input buffer 310 receives information indicating that re-encoding is to be performed due to occurrence of the CPB underflow (retry information), from a CPB management unit 340, which will be described below, the input buffer 310 outputs the video signal from a first picture in the GOP that is being encoded, to the encoding unit 320 again. Further, when the GOP encoding is completed without reception of the retry information, the input buffer 310 discards the stored video signal of the GOP.

The encoding unit 320 encodes the video signal input from the input buffer 310, and outputs an encoded stream to the output buffer 330. Further, the encoding unit 320 outputs a bit rate (bit rate information) generated when having encoded the input video signal, to the CPB management unit 340. Further, when the encoding unit 320 receives the retry information from the CPB management unit 340, the video signal from the first picture in the GOP that is being encoded is input from the input buffer 310 again and the encoding parameter for re-encoding is input from the parameter adjustment unit 370. Accordingly, the encoding unit 320 performs re-encoding using the input encoding parameter for re-encoding.

The output buffer 330 outputs the encoded stream of the GOP in a step in which the encoded streams of the GOP have all been stored. Meanwhile, when the retry information is received from the CPB management unit 340, the output buffer 330 discards the stored encoded stream of the GOP that is being encoded.

The CPB management unit 340 obtains a residual bit rate of the CPB changed over time using the bit rate information input from the encoding unit 320. In other words, the CPB management unit 340 obtains the residual bit rate of the CPB illustrated in the conceptual diagram of FIG. 1. Also, when the CPB underflow has occurred, the CPB management unit 340 outputs the retry information to the input buffer 310, the encoding unit 320, the retry count management unit 350, and the output buffer 330 to signal that the CPB underflow has occurred. Further, the CPB management unit 340 notifies the CPB state prediction unit 360 of the CPB residual bit rate.

When the retry count management unit 350 receives the retry information from the CPB management unit 340, the retry count management unit 350 adds 1 to the value of the current retry count and notifies the parameter adjustment unit 370 of the updated retry count.

Further, when encoding of the GOP that is currently being encoded is completed without the retry information being received from the CPB management unit 340 and if the value of the retry count is greater than or equal to 1, the retry count management unit 350 subtracts 1 from the value of the retry count and notifies the parameter adjustment unit 370 of the retry count. However, when the parameter change/non-change information notified from the CPB state prediction unit 360 indicates "no parameter change," the retry count management unit 350 does not subtract 1 from the retry count even when the retry count is greater than or equal to 1. Further, even when the retry count is 0, the retry count management unit 350 does not subtract 1 from the retry count, and notifies the parameter adjustment unit 370 of the value of the current retry count.

When the parameter adjustment unit 370 receives the retry count from the retry count management unit 350, the parameter adjustment unit 370 inputs the encoding parameter determined according to the retry count to the encoding unit 320. Accordingly, the encoding unit 320 performs encoding of the same GOP using the encoding parameter with which a generated bit rate decreases as the number of re-encoding repetitions increases.

As described above, in the present embodiment, a concept of the retry count whose value increases when re-encoding occurs and decreases at a time at which the GOP encoding is completed is introduced, and the retry count is managed by the retry count management unit 350. This retry count has a predetermined upper limit value, such as "3," and re-encoding of the same GOP is performed until the retry count reaches the upper limit value. The offset value of the quantization parameter and the filter strength of the pre-filter at the time of encoding are changed according to the value of the retry count.

When the retry count is 0, a default encoding parameter is used. When the retry count is not 0 and, for example, the upper limit value of the retry count is 3, the encoding parameters for re-encoding corresponding to the retry counts 1, 2, and 3 may be prepared as an encoding parameter table in advance and the encoding parameter obtained from the encoding parameter table may be used for re-encoding.

A flow of an encoding process in the present embodiment will be described with reference to the flowchart of FIG. 12. Hereinafter, correspondence to the flowchart of FIG. 12 is described as S301, S302, ..., and so on.

The following three cases of a process of encoding a certain GOP will be described.

[Case 1]: The CPB underflow has not occurred in encoding of the GOP.

[Case 2]: The CPB underflow has occurred multiple times in encoding of the GOP and could be avoided in re-encoding.

[Case 3]: The CPB underflow has occurred multiple times in encoding of the GOP and the retry count has reached the upper limit value, and the CPB underflow could not be avoided even in re-encoding.

[Process Example of Case 1]

First, case 1 in which the CPB underflow has not occurred in encoding of the GOP will be described. When the picture of the GOP is input to the input buffer 310, the input buffer 310 stores the picture and inputs the picture as an encoding target picture to the encoding unit 320 (S301). Also, the encoding unit 320 encodes the picture, outputs an encoded stream to the output buffer 330 (the output buffer 330 stores the encoded stream instead of outputting the encoded stream), and outputs bit rate information about the picture to the CPB management unit 340 (S302).

Here, for example, if the retry count is assumed to have an initial value of 0, a default encoding parameter is used for encoding, and the filtering process in the pre-filter unit 321 is applied to the encoding target picture with pre-filter strength corresponding to the default encoding parameter. Further, a DCT coefficient generated in the present picture is quantized by the quantization unit 322 using the quantization parameter according to the default encoding parameter. When the retry count is 1 or greater, encoding is performed using a pre-filtering and quantization process based on the filter strength and the quantization parameter determined according to the retry count.

The CPB management unit 340 calculates a CPB residual bit rate for the picture based on the bit rate information input from the encoding unit 320. In this example, since the CPB underflow has not occurred, the CPB management unit 340 does not output retry information (S303). When the encoding target picture is a last picture in the input video signal, the output buffer 330 outputs the stored encoded stream and the encoding process is completed (S304). Alternatively, if the encoding target picture is the last picture of the GOP, the output buffer 330 outputs the stored encoded stream, the input buffer 310 discards the stored picture, and the process proceeds to a process of encoding the first picture in the next GOP (S305 to S307).

As in case 1, when the GOP encoding is completed without causing the occurrence of the CPB underflow, the CPB management unit 340 notifies the CPB state prediction unit 360 of the CPB residual bit rate information at a time at which the GOP encoding is completed. The CPB state prediction unit 360 determines whether the CPB residual bit rate is equal to or greater than the predetermined threshold value. When the CPB residual bit rate is equal to or greater than the threshold value, the CPB state prediction unit 360 notifies the retry count management unit 350 that the encoding parameter is to be changed, as parameter change/non-change information. On the other hand, when the CPB residual bit rate is smaller than a threshold value, the CPB state prediction unit 360 notifies the retry count management unit 350 that the encoding parameter is not to be changed, as the parameter change/non-change information. The retry count management unit 350 decrements the value of the current retry count by 1 only when the parameter change/non-change information indicates that the encoding parameter is to be changed (S306).

In other words, when the re-encoding occurs in a GOP earlier than the GOP for which encoding is currently completed, the retry count may not be 0. In this case, the retry count management unit 350 changes the retry count according to the notification of the parameter change/non-change information from the CPB state prediction unit 360, and notifies the parameter adjustment unit 370 of the changed retry count. The parameter adjustment unit 370 sets the encoding parameter in the encoding unit 320 according to the notified retry count, and encoding of a first picture of a next GOP starts.

[Process Example of Case 2]

Next, case 2 in which CPB underflow has occurred multiple times in encoding of the GOP and could be avoided in re-encoding will be described. Here, a case in which the retry count at a time at which the GOP encoding starts is 1 and the re-encoding is performed twice in the same GOP will be described.

When the picture of the GOP is input to the input buffer 310, the input buffer 310 stores the picture and inputs the picture as an encoding target picture to the encoding unit 320 (S301). Also, the encoding unit 320 encodes the picture, outputs an encoded stream to the output buffer 330 (the output buffer 330 stores the encoded stream instead of outputting the encoded stream), and outputs bit rate information about the picture to the CPB management unit 340 (S302). Here, an encoding parameter corresponding to the retry count of 1 is used for encoding.

The CPB management unit 340 calculates a CPB residual bit rate for the picture based on the bit rate information input from the encoding unit 320. As a result, when the CPB management unit 340 detects the CPB underflow for the picture, the CPB management unit 340 outputs the retry information to the encoding unit 320, the retry count management unit 350, the input buffer 310, and the output buffer 330 (S303).

Since the current retry count is 1 and has not reached an upper limit value of 3 (S308), the input buffer 310 outputs the first picture of the stored GOP that is being encoded to the encoding unit 320 (S309). Meanwhile, the retry count is incremented by 1 by the retry count management unit 350, and the retry count whose value is 2 is output to the parameter adjustment unit 370 (S310).

The parameter adjustment unit 370 reads the encoding parameter when the retry count is 2 from the encoding parameter table, and sets the encoding parameter in the encoding unit 320 (S311). The output buffer 330 discards the encoded stream of the GOP that is being encoded.

In the encoding unit 320, the pictures of the GOP are sequentially input from the input buffer 310 and encoding is carried out only when the CPB underflow does not occur. In this encoding, when the CPB underflow occurs in the same GOP again, the retry count is incremented by 1 to be 3 through a process similar to the above-described process. Accordingly, the encoding parameter is changed into an encoding parameter corresponding to the retry count of 3 and then encoding is sequentially performed on the same GOP from its first picture again.

In encoding of the GOP, when the CPB underflow no longer occurs, the CPB management unit 340 notifies the CPB state prediction unit 360 of the CPB residual bit rate information. If the CPB residual bit rate is equal to or greater than the predetermined threshold value, the CPB state prediction unit 360 sets the parameter change/non-change information as "change," and otherwise, sets the parameter change/non-change information as "no change." The CPB state prediction unit 360 notifies the retry count management unit 350 of the parameter change/non-change information.

When the notified parameter change/non-change information is "change," the retry count is decremented by 1 to be 2 by the retry count management unit 350, and encoding of a next GOP is carried out. In this case, operations of the input buffer 310 and the output buffer 330 are similar to those in the above-described example. When the parameter change/non-change information is "no change," the retry count remains as 3, and encoding of a next GOP is carried out.

A conceptual diagram of a transition of the retry count and the encoding parameter in the example of case 2 is illustrated in FIG. 11. In the example of FIG. 11, when the second GOP2 is encoded in a state in which the retry count is 1, the CPB underflow occurs in encoding of the sixth picture, as in the second embodiment. Accordingly, the retry count is set to 2, and GOP2 is re-encoded from its first I picture using the encoding parameter corresponding to the retry count of 2 again. Even in this re-encoding, the CPB underflow occurs in a seventh picture and re-encoding is performed using an encoding parameter corresponding to the retry count of 3 with which a generated bit rate is small.

Since the CPB underflow does not occur in performing re-encoding again, a determination is made as to whether the CPB residual bit rate is equal to or greater than a predetermined threshold value. Here, since the CPB residual bit rate is equal to or greater than the predetermined threshold value, the retry count is decremented by 1 when encoding of GOP2 is completed, and the process proceeds to encoding of the next GOP3 using the encoding parameter corresponding to the retry count of 2.

A conceptual diagram of a transition of the CPB residual bit rate when re-encoding is performed is illustrated in FIG. 8. A line indicated by a bold line is a CPB residual bit rate after re-encoding, as in the first and second embodiments. Since the blurring degree is strengthened by a pre-filter and the quantization parameter is greater than the default encoding parameter in re-encoding, a generated bit rate is suppressed and the transition as illustrated, for example, in FIG. 8 is performed such that the CPB underflow is suppressed.

[Process Example of Case 3]

Lastly, case 3 in which CPB underflow has occurred multiple times in encoding the same GOP and the retry count reaches the upper limit value, and the CPB underflow could not be avoided even in re-encoding will be described. The retry count is assumed to reach 3 during encoding of a certain GOP, similar to case 2. Further, when the CPB management unit 340 detects the CPB underflow in encoding the same GOP (S303), the retry count management unit 350 detects that the retry count reaches the upper limit value (S308) and re-encoding is completed. Further, in this case, encoding may not be completed and frame dropping may be allowed so that encoded data of the picture in which the CPB underflow has occurred is discarded without completing encoding and a next picture is encoded.

Fourth Embodiment

Figure 14:
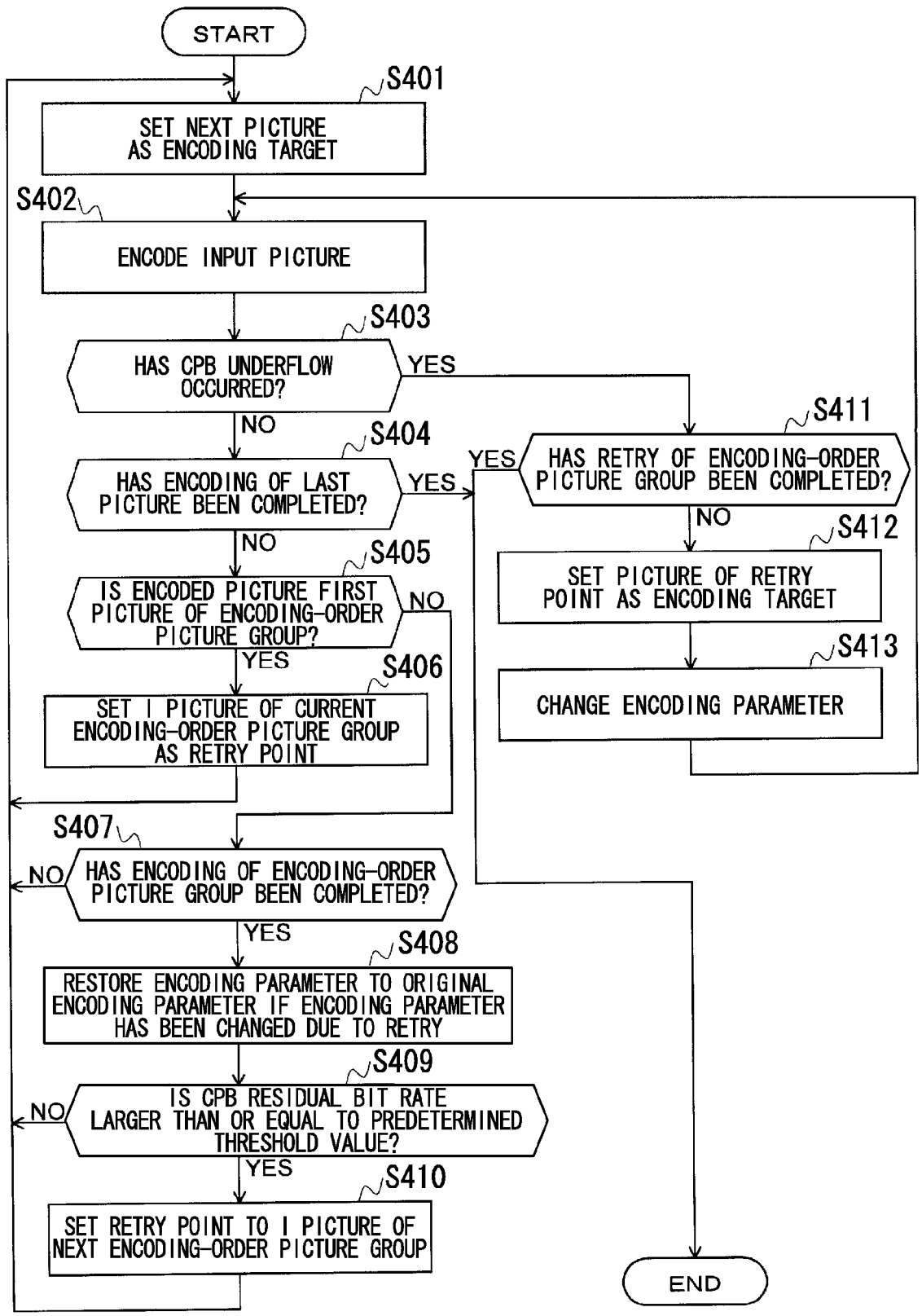
FIG. 14 is a flowchart illustrating a video encoding control method according to a fourth embodiment of the present invention.

Next, a fourth embodiment of the present invention will be described. FIG. 14 is a process flowchart illustrating a video encoding control method according to the fourth embodiment of the present invention.

First, a picture next to a picture for which encoding has ended in an input video signal is set as an encoding target (step S401). The input picture set as the encoding target is encoded using H.264 or any of other predetermined encoding schemes (step S402). A determination is made as to whether CPB underflow has occurred due to encoding of the input picture (step S403). If the CPB underflow has occurred, the process proceeds to step S411. Further, a determination may be made as to whether the CPB underflow has occurred, for example, using a method used in the H.264 standard.

If the CPB underflow has not occurred, a determination is made as to whether encoding of a last picture is completed (step S404). If encoding of the last picture is completed, the encoding process ends.

Otherwise, a determination is made as to whether the encoded picture is a first I picture of the encoding-order picture group (step S405). If the currently encoded picture is the first I picture of the encoding-order picture group, the I picture is set as the retry point (step S406). This is a process for updating the retry point after it has been confirmed that the CPB underflow has not occurred in a next I picture since the retry point is still set to a first picture of an immediately previous encoding-order picture group when a CPB residual bit rate is smaller than a predetermined threshold value in step S409, which will be described below. Further, when the retry point is set in step S410, the retry point is set to the same position again, but a disadvantage does not occur in the process. Then, the process returns to step S401 in which encoding of a next picture is carried out.

If the encoded picture is not the first picture in the encoding-order picture group, then a determination is made as to whether encoding of the encoding-order picture group is completed (step S407). If the encoding of the encoding-order picture group is not completed, the process returns to step S401 in which and the encoding process continues to be similarly performed on a next picture. If the encoding of the encoding-order picture group is completed and the encoding parameter has been changed due to re-encoding of the encoding-order picture group (retry), the encoding parameter restores to a value at the time of normal encoding (step S408).

Further, a determination is made as to whether the CPB residual bit rate is equal to or greater than the predetermined threshold value at a time at which the encoding of the encoding-order picture group is completed (step S409). When the CPB residual bit rate is equal to or greater than the predetermined threshold value, the retry point is set to a first I picture of a next encoding-order picture group (step S410). Then, the process returns to step S401 in which encoding of the next encoding-order picture group is carried from its first picture.

When the CPB residual bit rate is smaller than the predetermined threshold value, the retry point is not updated and the process returns to step S401 in which encoding of the next encoding-order picture group is carried out.

When it is determined in step S403 that the CPB underflow has occurred, a determination is made as to whether the current encoding-order picture group has been re-encoded (the retry has been completed) (step S411). If the retry has been completed, the CPB underflow could not be avoided even when the encoding-order picture group is re-encoded. Accordingly, encoding ends. If the retry has not been completed, the picture of the retry point is set as an encoding target in order to re-encode the current encoding-order picture group (step S412). Also, one or both of the two encoding parameters (the quantization parameter and the pre-filter strength) are changed (for the quantization parameter, the step size is changed to be greater, and for the filter strength, the blurring degree is changed to be greater) (step S413), and the process returns to step S402 in which the encoding-order picture group that is being encoded is re-encoded.

In other words, the encoding-order picture group (e.g., the GOP) is encoded twice only when the CPB underflow has occurred, unlike related art b in which all frames of the input video are encoded twice. At the time of second encoding, encoding is performed with an encoding parameter for suppressing the CPB underflow. Only a corresponding encoding-order picture group is re-encoded (exceptionally, re-encoding may be performed from an immediately previous encoding-order picture group) only when the CPB underflow has occurred, thereby suppressing the CPB underflow. Accordingly, a calculation amount can be reduced as compared to related art b in which all pictures of the input video are encoded twice.

Figure 15:
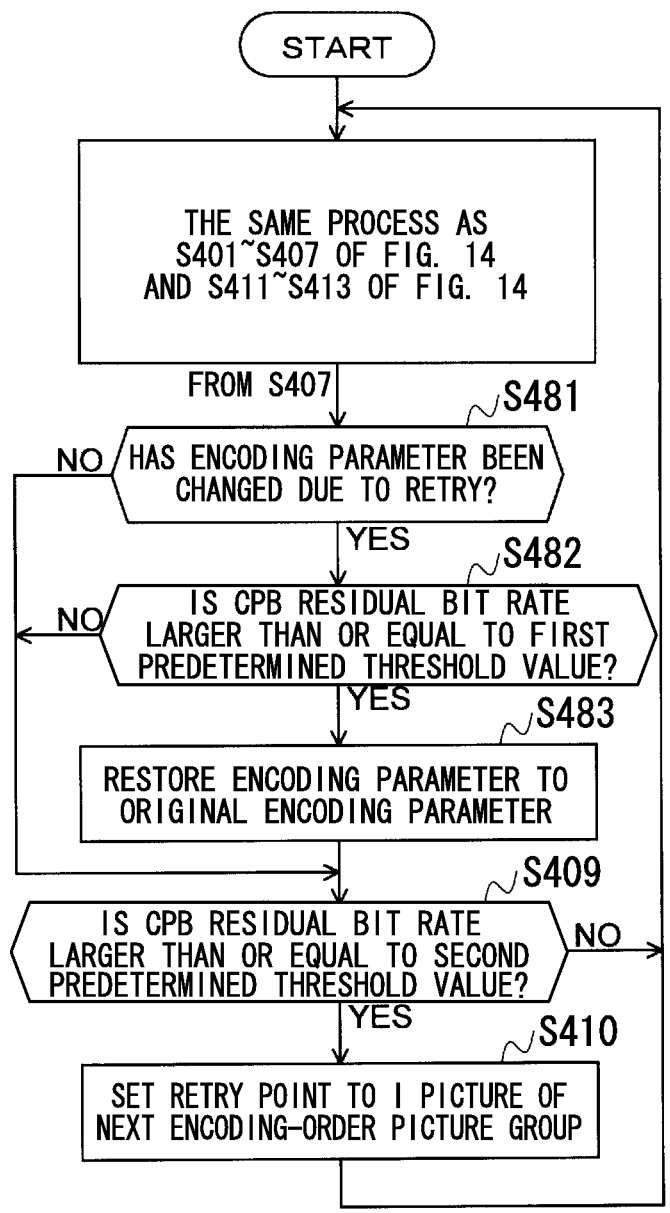
FIG. 15 is a flowchart of a variant of the video encoding control method according to the fourth embodiment of the present invention.

FIG. 15 is a process flowchart illustrating a video encoding control method according to a variant of the fourth embodiment of the present invention. The present invention may be implemented by replacing the process of step S408 illustrated in FIG. 14 with a process of steps S481 to S483 illustrated in FIG. 15. Processes other than step S408 are substantially similar to those in FIG. 14.

Following the process of step S407 of FIG. 14, a determination is made as to whether the encoding parameter has been changed due to the retry (step S481). If the encoding parameter has not been changed due to the retry, the process proceeds to step S409. If the encoding parameter has been changed due to the retry, then a determination is made as to whether the CPB residual bit rate is equal to or greater than a first predetermined threshold value (step S482). If the CPB residual bit rate is smaller than the predetermined threshold value, the encoding parameter remains as the encoding parameter used in re-encoding, and the encoding parameter restores to the original default encoding parameter only when the CPB residual bit rate is equal to or greater than the predetermined threshold value, (step S483). Then, the process proceeds to step S409 in which a determination is made as to whether the CPB residual bit rate is equal to or greater than a second predetermined threshold value, but this process and the process of step S410 are similar to the process of steps S409 and S410 illustrated in FIG. 14. Further, the first threshold value and the second threshold value may be the same values or different values.

In the variant illustrated in FIG. 15, the encoding parameter restores to the value at the time of normal encoding only when the CPB residual bit rate exceeds the predetermined amount at a time at which the encoding of the encoding-order picture group is completed, as described above. This is for the following reason. Even when encoding of the encoding-order picture group is completed, if the CPB residual bit rate is small, restoring of the encoding parameter to the value at the time of normal encoding increases the generated bit rate, such that the CPB underflow is highly likely to occur in encoding pictures in a next encoding-order picture group. In the process of FIG. 15, if the CPB residual bit rate is small, the encoding parameter is not changed. Accordingly, occurrence of the re-encoding is suppressed in encoding of the next encoding-order picture group and the calculation amount is further reduced, as compared to the process of FIG. 14.

As described above, in the present embodiment, the encoding parameter is changed at the time of re-encoding. Here, at the time of encoding, a pre-filter is applied to the input video, and encoding parameters to be changed are a quantization parameter and pre-filter strength. Both of the encoding parameters may be changed or only any one of them may be changed.

For the quantization parameter, a predetermined offset value is added to the quantization parameter value at the time of normal encoding, and re-encoding is performed using such a greater quantization parameter.

For the pre-filter, a Gaussian filter is used, as in the first embodiment. The Gaussian filter can be produced by sampling a Gaussian distribution shown in Equation (1) described above with respect to x and y.

In Equation (1), when $\sigma$ is equal to 0, the Gaussian filter is not applied and, for example, the default encoding parameter $\sigma_0=0$ and the encoding parameter for re-encoding $\sigma_1>0$. Further, a type of low pass filter does not matter in the present invention. Further, how the blurring degree is strengthened at the time of re-encoding may be arbitrarily determined in advance. For example, the default encoding parameter $\sigma_0$ is changed according to degree of complexity of each picture, and $\sigma_1$ may be obtained by adding a predetermined offset to $\sigma_0$.

For encoding, encoding according to the standard of H.264 is performed. Further, in the present embodiment, the encoding-order picture group is a GOP. A conceptual diagram of the GOP when encoded is as illustrated in FIG. 5. One GOP includes 10 pictures, and B pictures and P pictures are alternately lined up in a display order, with an I picture being a first picture, as in the first embodiment.

Figure 16:
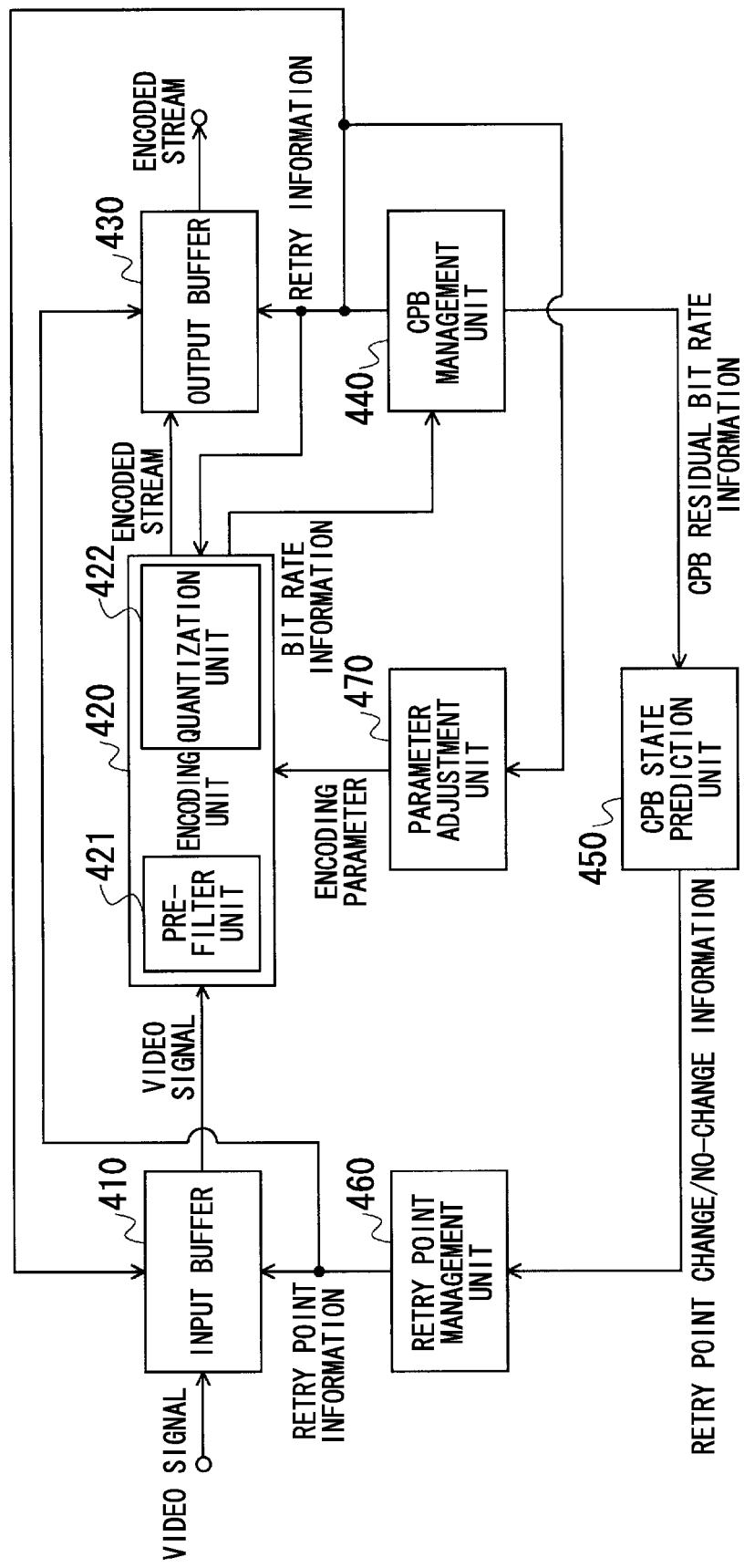
FIG. 16 is a block diagram illustrating a video encoding apparatus according to the fourth embodiment of the present invention.

An example of an apparatus configuration of the fourth embodiment of the present invention is illustrated in FIG. 16. An input buffer 410 stores an input video signal and outputs a video signal as an encoding target to an encoding unit 420. Further, when the input buffer 410 receives information indicating that re-encoding is to be performed (retry information) due to the occurrence of the CPB underflow from a CPB management unit 440, which will be described below, the input buffer 410 outputs the video signal from a first picture of the GOP set as the retry point to the encoding unit 420 again. Further, when the retry point information is input from the retry point management unit 460, the input buffer 410 discards the stored video signal of the GOP earlier than the retry point.

The encoding unit 420 encodes the video signal input from the input buffer 410, and outputs an encoded stream to an output buffer 430. Further, the encoding unit 420 outputs a bit rate (bit rate information) generated when encoding the input video signal to the CPB management unit 440. Further, when the encoding unit 420 receives the retry information from the CPB management unit 440, a video signal from the first picture of the GOP indicated by the retry point is input from the input buffer 410 again and the encoding parameter for re-encoding is input from the parameter adjustment unit 470. Accordingly, re-encoding is performed using the input encoding parameter for re-encoding.

The output buffer 430 outputs an encoded stream determined to be output, that is, an encoded stream as an encoding result determined not to require re-encoding based on retry point information from a retry point management unit 460. Meanwhile, when the output buffer 430 receives the retry information from the CPB management unit 440, the output buffer 430 discards the stored encoded streams of the GOP that is being encoded.

The CPB management unit 440 obtains a residual bit rate of the CPB changed over time using the bit rate information input from the encoding unit 420. Also, when the CPB underflow has occurred, the CPB management unit 440 outputs the retry information to the input buffer 410, the encoding unit 420, the parameter adjustment unit 470, and the output buffer 430 to signal that the CPB underflow has occurred.

The CPB state prediction unit 450 determines whether the CPB residual bit rate is equal to or greater than the predetermined threshold value. If the CPB residual bit rate is equal to or greater than the threshold value, the CPB state prediction unit 450 notifies the retry point management unit 460 of information indicating that the retry point of a next GOP is its first I picture, as retry point change/non-change information. Conversely, when the CPB residual bit rate is smaller than the threshold value, the CPB state prediction unit 450 notifies the retry point management unit 460 of information indicating that the retry point of the first picture of the next GOP is a first picture (an I picture) of a GOP immediately before such a GOP, as the retry point change/non-change information.

When the retry change/non-change information indicates that the retry point of the first picture of the GOP to be now encoded is a first picture of an immediately previous GOP, the retry point management unit 460 notifies the input buffer 410 of the retry point and notifies the input buffer 410 that the retry point is the first picture of the currently encoded GOP from encoding of the next picture when re-encoding does not occur in encoding of the first picture. Further, when the retry change/non-change information indicates that the retry point is the first picture of the GOP to now be encoded, the retry point management unit 460 notifies the input buffer 410 and the output buffer 430 of the retry point. Here, the notification information is referred to as retry point information. As described above, the input buffer 410 inputs a video signal from the picture based on the retry point information at the time of re-encoding to the encoding unit 420, and the output buffer 430 outputs only an encoded stream determined to be output based on the retry point information.

When a parameter adjustment unit 470 receives the retry information from the CPB management unit 440, the parameter adjustment unit 470 inputs the encoding parameter for re-encoding to the encoding unit 420, as described above. Accordingly, the encoding unit 420 performs encoding of the same GOP using an encoding parameter with which a generated bit rate decreases at the time of re-encoding.

A flow of an encoding process in the present embodiment will be described with reference to a flowchart of FIG. 14. Hereinafter, correspondence to the flowchart of FIG. 14 is described as S401, S402, . . . , and so on.

The following four cases of a process of encoding certain GOPs in which a first GOP is GOP1 and a next GOP is GOP2 will be described.

[Case 1]: Encoding of GOP1 has been completed without occurrence of the CPB underflow in encoding GOP1, and the CPB underflow has not occurred even in encoding a first picture of next GOP2.

[Case 2]: Encoding of GOP1 has been completed, and the CPB underflow has occurred in encoding of a first picture of next GOP2, such that re-encoding is necessary.

[Case 3]: The CPB underflow has occurred in encoding an intermediate picture of GOP2, such that re-encoding is necessary.

[Case 4]: The CPB underflow has occurred in encoding GOP2 and could not be avoided even in re-encoding.

[Process Example of Case 1]

First, case 1 in which the CPB underflow has not occurred in encoding GOP1 will be described. When a picture of GOP1 is input to the input buffer 410, the input buffer 410 stores the picture and inputs the picture as an encoding target picture to the encoding unit 420 (S401). Also, the encoding unit 420 encodes the picture, outputs an encoded stream to the output buffer 430 (the output buffer 430 stores the encoded stream instead of outputting the encoded stream), and outputs bit rate information about the picture to the CPB management unit 440 (S402).

Here, a default encoding parameter is used for encoding, and a filtering process in the pre-filter unit 421 is applied to the encoding target picture with pre-filter strength corresponding to the default encoding parameter. Further, a DCT coefficient generated in the present picture is quantized by the quantization unit 422 using the quantization parameter according to the default encoding parameter.

The CPB management unit 440 calculates a CPB residual bit rate for the picture based on the bit rate information input from the encoding unit 420. In this example, since the CPB underflow has not occurred, the CPB management unit 440 does not output retry information (S403). When the encoding target picture is a last picture in the input video signal, the output buffer 430 outputs stored encoded streams and the encoding process is completed (S404).

When the encoding target picture is a first picture in GOP1 (S405), the retry point management unit 460 sets the first picture in GOP1 (I picture) as a retry point (S406) and then the encoding unit 420 performs encoding of a next picture.

Alternatively, if the encoding target picture is a last picture of the GOP, the parameter adjustment unit 470 changes the encoding parameter into the default encoding parameter when the encoding parameter for re-encoding has been used in re-encoding (S408).

Meanwhile, the CPB management unit 440 outputs CPB residual bit rate information to the CPB state prediction unit 450, and the CPB state prediction unit 450 determines whether the CPB residual bit rate is equal to or greater than a predetermined threshold value (S409). The CPB state prediction unit 450 notifies the retry point management unit 460 of a determination result as the retry point change/non-change information described above. When the retry point change/non-change information indicates that the retry point is not to be changed (the CPB residual bit rate is smaller than the threshold value), the retry point management unit 460 notifies the input buffer 410 of the retry point being the first picture in the GOP1 as retry point information. Then, the process proceeds to a process of encoding a first I picture in GOP2 (S402). When the CPB underflow does not occur in encoding the I picture (403), the retry point management unit 460 notifies the input buffer 410 and the output buffer 430 of the retry point being the first picture in GOP2 (S406). In other words, when re-encoding occurs in a subsequent picture of GOP2, re-encoding is performed from the first picture in GOP2.

When the CPB residual bit rate is sufficient at a time at which the above-described encoding of GOP1 is completed, the retry point change/non-change information indicating that the retry point is to be changed is output from the CPB state prediction unit 450 to the retry point management unit 460, and the retry point management unit 460 notifies the input buffer 410 of the retry point being the first picture in GOP2 as the retry point information (S410). In this case, even when the CPB underflow occurs in any picture of the later GOP2, re-encoding is performed from the first picture in GOP2.

[Process Example of Case 2]

Next, case 2 in which CPB underflow has occurred in encoding of the first picture in GOP2 and could be avoided in re-encoding will be described. When the retry point change/non-change information at a time at which encoding of GOP1 is completed indicates that the retry point is not to be changed due to the CPB residual bit rate being small as in case 1, the retry point management unit 460 notifies the input buffer 410 of the retry point being the first I picture of GOP1.

The process proceeds to a process of encoding a first I picture in GOP2. When the CPB management unit 440 detects that CPB underflow has occurred in the picture (S403), the input buffer 410 inputs pictures sequentially from the first picture of GOP1 to the encoding unit 420 based on the retry information from the CPB management unit 440, and the encoding unit 420 performs re-encoding. In this case, as the encoding parameter, the encoding parameter for re-encoding set from the parameter adjustment unit 470 is used (S413). In this re-encoding, the pre-filtering process is applied to the encoding target picture with the pre-filter strength corresponding to the encoding parameter for re-encoding (the blurring degree is greater than the default encoding parameter) by the pre-filter unit 421. Further, a DCT coefficient generated in the present picture is quantized by the quantization unit 422 with a quantization parameter according to the encoding parameter for re-encoding (the quantization step size is greater than the default encoding parameter).

When encoding is completed up to the last picture of GOP1 by re-encoding of GOP1, the retry point is set to the first picture in GOP1 or the first picture in GOP2 by the CPB residual bit rate at this time, and then a process of encoding the first picture in GOP2 is carried out.

[Process Example of Case 3]

In case 2 described above, the example in which re-encoding is necessary since the CPB underflow occurs in encoding of the first picture of GOP2 has been described. Meanwhile, when the CPB underflow has occurred in a picture other than the first picture in GOP2, re-encoding is similarly performed from the first picture in GOP2 using the encoding parameter for re-encoding.

A conceptual diagram of a change in the encoding parameter when re-encoding is performed on an intermediate picture in GOP2 is as illustrated in FIG. 7. In the example of FIG. 7, as in the first embodiment, since the CPB underflow occurs in encoding of the sixth picture in GOP2, the encoding parameter for re-encoding to suppress a generated bit rate is set and GOP2 is re-encoded from its first I picture. Since the occurrence of the CPB underflow is suppressed due to re-encoding, the encoding parameter for re-encoding restores to the default encoding parameter in encoding of next GOP3, and the encoding process is continued.

A conceptual diagram of a transition of the CPB residual bit rate when re-encoding is performed is as illustrated in FIG. 8. A line indicated by a bold line is a CPB residual bit rate after re-encoding, as in the first to third embodiments. Since a blurring degree is strengthened by a pre-filter and the quantization parameter is greater than the default encoding parameter in re-encoding, a generated bit rate is suppressed and the transition as illustrated, for example, in FIG. 8 is performed, such that the CPB underflow is suppressed.

[Process Example of Case 4]

Lastly, case 4 in which CPB underflow has occurred in encoding of GOP2 and could not be avoided even in re-encoding will be described. In this case, an operation in which the CPB management unit 440 detects the CPB underflow and re-encoding of GOP2 is performed is similar to that in the above case 3. When the CPB underflow has occurred during re-encoding of GOP2, encoding is completed (S411). Further, encoding may not be completed and frame dropping may be allowed so that encoded data of the picture in which the CPB underflow has occurred is discarded without completing encoding and a next picture is encoded.

Fifth Embodiment

Figure 17:
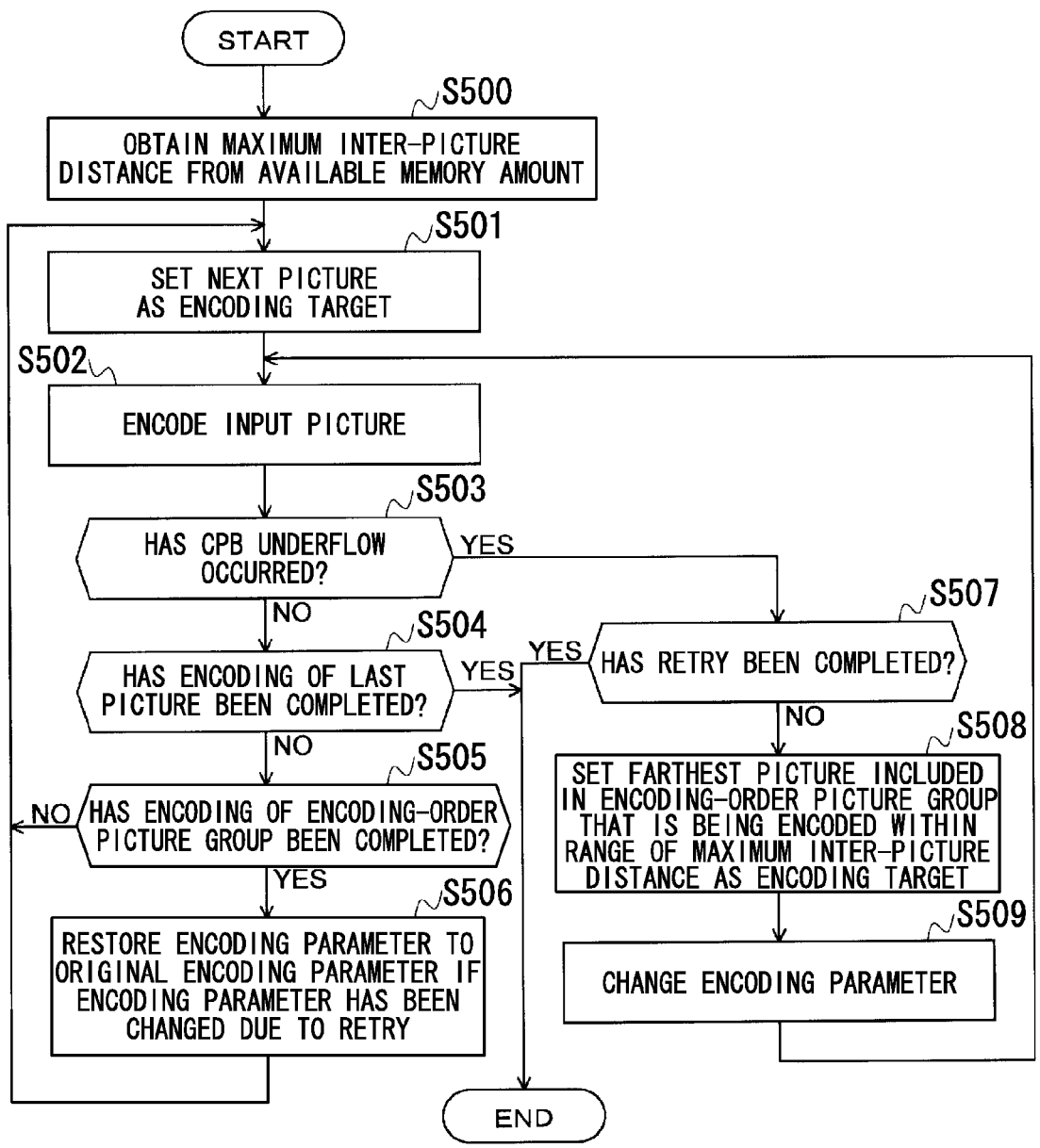
FIG. 17 is a flowchart illustrating a video encoding control method according to a fifth embodiment of the present invention.

Next, a fifth embodiment of the present invention will be described. FIG. 17 is a process flowchart illustrating a video encoding control method according to the fifth embodiment of the present invention.

For an $M^{th}$ picture and an $N^{th}$ picture (N>M) in an encoding order, N-M is referred to as an inter-picture distance. First, a maximum inter-picture distance that is an inter-picture distance that can be traced back to the maximum within a memory limit at the time of re-encoding is obtained based on information of an available memory amount given from the outside, and stored (S500).

Next, a picture next to the picture for which the encoding has ended in the input video signal (the first picture of the input video signal when the encoding starts) is set as an encoding target (step S501). The input picture set as the encoding target is encoded using H.264 or any of other predetermined encoding schemes (step S502). A determination is made as to whether the CPB underflow has occurred due to encoding of the input picture (step S503). If the CPB underflow has occurred, the process proceeds to step S507. Further, a determination may be made as to whether the CPB underflow has occurred, for example, using a method used in the H.264 standard.

If the CPB underflow has not occurred, a determination is made as to whether encoding of a last picture is completed (step S504). If the encoding of the last picture is completed, the encoding process ends.

Otherwise, a determination is made as to whether coding of the coding-order picture group is completed (step S505). If the encoding of the encoding-order picture group is not completed, the process returns to step S501 in which the encoding process continues to be similarly performed on the next picture. If the encoding of the encoding-order picture group is completed and the encoding parameter has been changed due to re-encoding of the encoding-order picture group (retry), the encoding parameter restores to the value at the time of normal encoding (step S506), and the process returns to step S501 in which the encoding process is performed from a first picture of a next encoding-order picture group.

If it is detected in step S503 that the CPB underflow has occurred, a determination is made as to whether the current encoding-order picture group has been re-encoded (the retry has been completed) (step S507). If the retry has been completed, the CPB underflow could not be avoided even when pictures in the encoding-order picture group is re-encoded. Accordingly, encoding ends. If the retry has not been completed, a retry point is set for re-encoding of the picture in the current encoding-order picture group. In other words, a farthest picture included in the encoding-order picture group that is being encoded within a range of the maximum inter-picture distance calculated in step S500 is set as the encoding target (step S508). Also, one or both of the two encoding parameters (the quantization parameter and the pre-filter strength) are changed (for the quantization parameter, the step size is changed to be greater, and for the filter strength, the blurring degree is changed to be greater) (step S509), and the process returns to step S502 in which re-encoding is performed from the picture in the encoding-order picture group set as the retry point.

According to the re-encoding process described above, a plurality of pictures in the encoding-order picture group (e.g., the GOP) are encoded twice only when the CPB underflow has occurred, unlike related art b in which all frames of the input video are encoded twice. At the time of second encoding, encoding is performed using an encoding parameter for suppressing the CPB underflow. Only a plurality of pictures in a corresponding encoding-order picture group are re-encoded to suppress the CPB underflow only when the CPB underflow has occurred. Accordingly, a calculation amount can be reduced as compared to related art b in which all pictures of the input video are encoded twice. Further, a memory required as the input buffer and the output buffer may have only a size corresponding to a predetermined number of pictures, such that memory reduction can be achieved.

Figure 18:
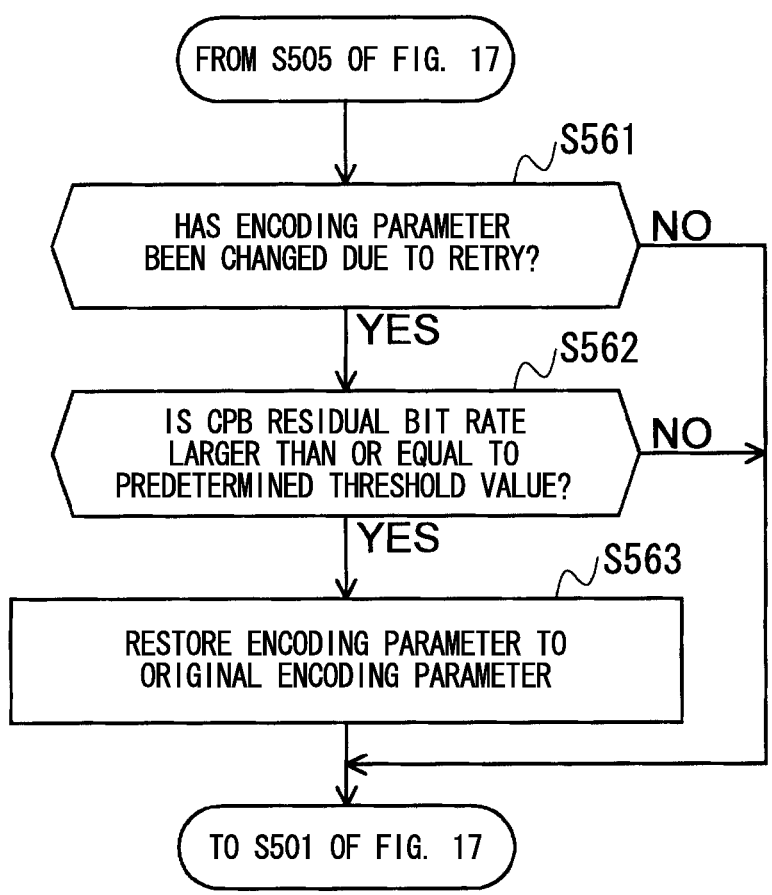
FIG. 18 is a flowchart of a variant of the video encoding control method according to the fifth embodiment of the present invention.

FIG. 18 is a process flowchart illustrating a video encoding control method according to a variant of the fifth embodiment of the present invention. The present invention may be implemented by replacing the process of step S506 illustrated in FIG. 17 with a process of steps S561 to S563 illustrated in FIG. 18. Processes other than step S506 are similar to those illustrated in FIG. 17.

Following the process of step S505 of FIG. 17, a determination is made as to whether the encoding parameter has been changed due to retry (step S561). If the encoding parameter has not been changed due to the retry, the process proceeds to step S501 of FIG. 17. If the encoding parameter has been changed due to the retry, then a determination is made as to whether the CPB residual bit rate is equal to or greater than a predetermined threshold value (step S562). If the CPB residual bit rate is smaller than the predetermined threshold value, the encoding parameter remains as the encoding parameter used in re-encoding. The encoding parameter restores to an original default encoding parameter only when the CPB residual bit rate is equal to or greater than the predetermined threshold value, (step S563). Then, the process returns to step S501 of FIG. 17 in which encoding of a next encoding-order picture group is carried out.

In the variant illustrated in FIG. 18, the encoding parameter restores to the value at the time of normal encoding only when the CPB residual bit rate exceeds the predetermined amount at a time at which the encoding of the encoding-order picture group is completed. This is for the following reason. If the CPB residual bit rate is small even when encoding of the encoding-order picture group is completed, restoring of the encoding parameter to the value at the time of normal encoding increases a generated bit rate, and accordingly, the CPB underflow is highly like to occur in encoding of the next encoding-order picture group. In the process of FIG. 18, if the CPB residual bit rate is small, the encoding parameter is not changed such that occurrence of re-encoding is suppressed in encoding of the next encoding-order picture group and a calculation amount is further reduced, as compared to the process of FIG. 17.

In the present embodiment, the encoding parameter is changed at the time of re-encoding, as described above. Here, a pre-filter is applied to the input video at the time of encoding, and the encoding parameters to be changed are a quantization parameter and pre-filter strength. Both of the two encoding parameters may be changed or any one of them may be changed.

For the quantization parameter, a predetermined offset value is added to the quantization parameter value at the time of normal encoding and re-encoding is performed using a greater quantization parameter.

For the pre-filter, a Gaussian filter is used in the present embodiment, as in the first embodiment. The Gaussian filter can be produced by sampling a Gaussian distribution shown in Equation (1) described above with respect to x and y.

In Equation (1), when $\sigma$ is equal to 0, the Gaussian filter is not applied, and for example, a default encoding parameter $\sigma_0=0$ and the encoding parameter for re-encoding $\sigma_1>0$. Further, a type of low pass filter does not matter in the present invention. Further, how the blurring degree is strengthened at the time of re-encoding may be arbitrarily determined in advance. For example, the default encoding parameter $\sigma_0$ may be changed according to degree of complexity of each picture and $\sigma_1$ may be obtained by adding a predetermined offset to $\sigma_0$.

For encoding, encoding according to the standard of H.264 is performed. Further, in the present embodiment, the encoding-order picture group is a GOP, and a conceptual diagram of the GOP when encoded is as illustrated in FIG. 5. One GOP includes 10 pictures, and B pictures and P pictures are alternately lined up in a display order, with an I picture being a first picture, as in the first embodiment.

Figure 19:
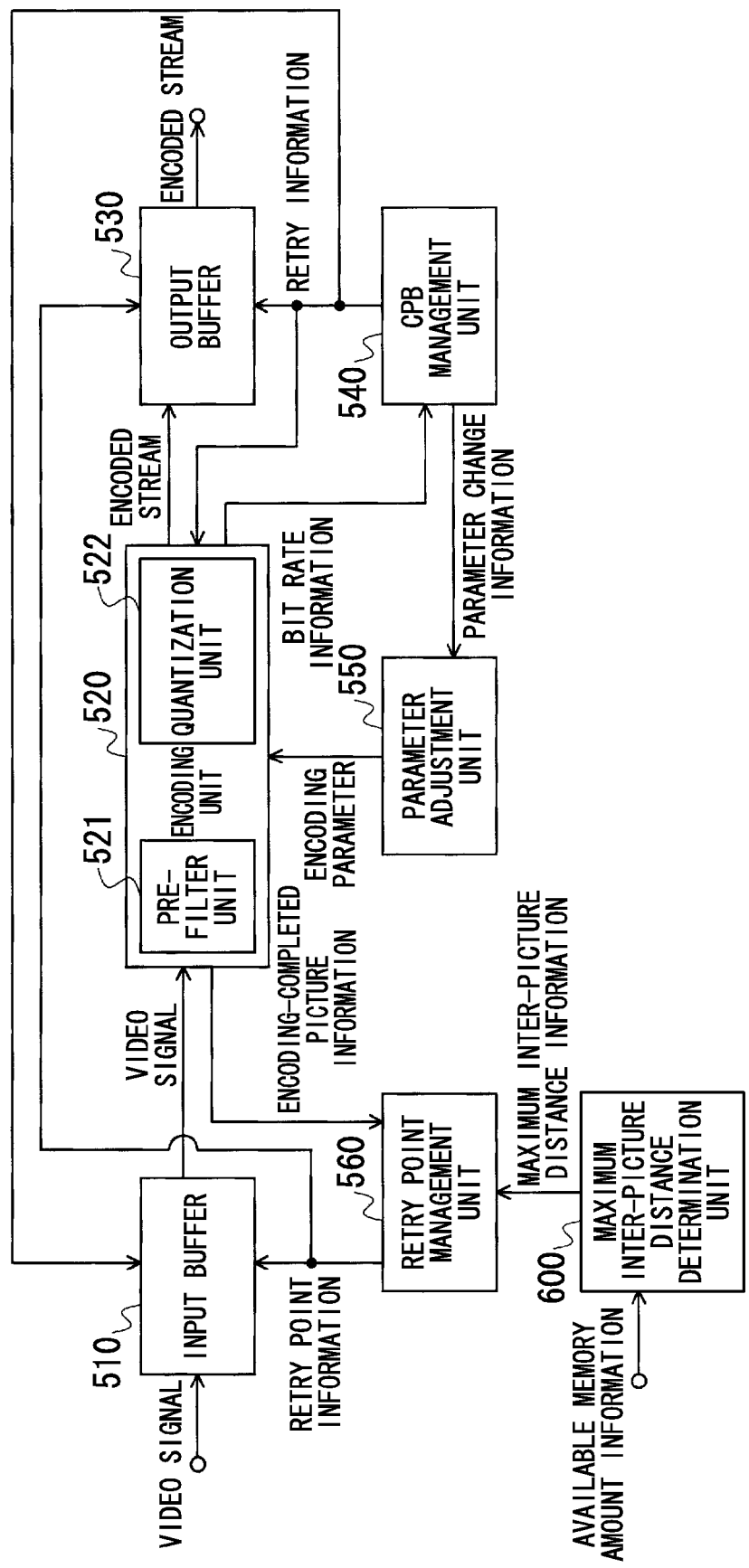
FIG. 19 is a block diagram illustrating a video encoding apparatus according to the fifth embodiment of the present invention.

An example of an apparatus configuration of the fifth embodiment of the present invention is illustrated in FIG. 19. A maximum inter-picture distance determination unit 600 is notified of an available memory amount (available memory amount information) from the outside, and obtains a maximum inter-picture distance that can be traced back to the maximum at the time of re-encoding based on the available memory amount information. In the present embodiment, an input video signal of the GOP that is being encoded is stored in an input buffer 510 and an encoded stream of the GOP that is being encoded is stored in an output buffer 530 in order to cope with re-encoding. The maximum inter-picture distance determination unit 600 obtains an inter-picture distance in which a sum of a required memory amount in the worst case of the input buffer 510 and the output buffer 530 and another used memory amount is smaller than or equal to the available memory amount, while decreasing a value of the maximum inter-picture distance starting from a GOP length being the maximum inter-picture distance, to determine the maximum inter-picture distance.

Here, an example in which the required memory amount when the maximum inter-picture distance is obtained is calculated is illustrated. First, a required memory amount of the input buffer 510 is as follows.

Required memory amount of input buffer=(maximum inter-picture distance+1)×(data amount of one picture)

Meanwhile, the required memory amount of the output buffer 530 is a maximum bit rate that can be generated without causing CPB underflow under limitations of a size of the CPB and a bit rate. Concretely, the required memory amount is a maximum bit rate in which a case in which data input to the CPB according to the bit rate has all been used (the CPB residual bit rate is 0 after GOP encoding) in a state in which the CPB residual bit rate immediately before encoding of the GOP starts is equal to a size of the CPB can occur. As a calculation equation using the number of bits, the required memory amount of the output buffer is represented as the following equation.

Required memory amount of output buffer=(bit rate/number of pictures per second)×(maximum inter-picture distance+1)+(size of CPB in number of bits)

Further, a data amount of the following data may need to be calculated. In the case of H.264, a decoded picture produced during GOP encoding should be kept as a reference picture (if the decoded picture is not kept, there is no reference picture when encoding is performed from the retry point at the time of re-encoding) in order to cope with re-encoding. The picture in the GOP does not reference a picture earlier than the GOP. Accordingly, when a reference picture is stored in a DPB (Decoded Picture Buffer), a memory becomes sufficient for I and P pictures in all situations when the memory is secured as follows.

When re-encoding occurs in the last picture in the GOP, a memory corresponding to the number of I and P pictures in the encoding-order picture group earlier than a picture from which re-encoding starts (a picture at the maximum inter-picture distance) in the encoding order may be prepared.

Figure 20:
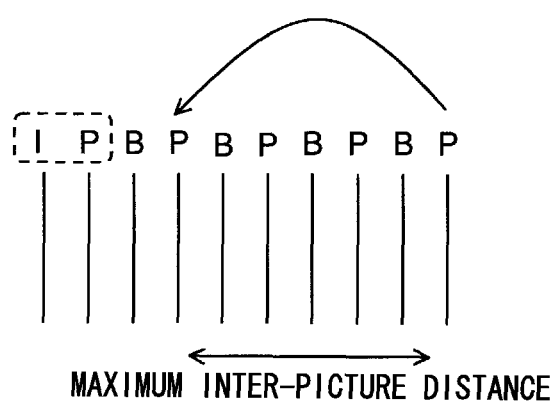
FIG. 20 is a conceptual diagram illustrating a required memory amount for a reference picture in the fifth embodiment of the present invention.

In FIG. 20, a conceptual diagram for explaining this required memory amount is illustrated. For example, the GOP includes 10 pictures, and a maximum inter-picture distance is 6, as illustrated in FIG. 20. The number of pictures to be held in the input buffer 510 is a maximum of 7. Meanwhile, in the example of FIG. 20, decoded pictures of a first I picture and a next P picture should also be held as reference pictures in the memory, for re-encoding. When this case is compared with a case in which the maximum inter-picture distance is equal to the GOP length, a DPB for two pictures of the first I picture and the second P picture should be additionally held in the case as illustrated in FIG. 20, but the number of pictures to be held in the input buffer 510 is reduced by 3. In other words, as the maximum inter-picture distance is smaller, a memory amount for reference pictures increases, but the number of pictures to be stored in the input buffer 510 is more reduced. Accordingly, it can be seen that a small maximum inter-picture distance reduces the required memory amount.

Further, in H.264, a motion vector of the reference picture may be referenced, and accordingly, a memory for the motion vector may be necessary. In addition, calculation of the required memory depends on, for example, a configuration of an encoder. An inter-picture distance in which a sum of these memory amounts is smaller than or equal to the available memory amount is obtained to determine the maximum inter-picture distance.

Further, in implementing the present invention, the maximum inter-picture distance may be calculated externally and given to the maximum inter-picture distance determination unit 600, instead of signaling the maximum inter-picture distance determination unit 600 of the available memory amount externally and calculating the maximum inter-picture distance.

The maximum inter-picture distance determination unit 600 notifies a retry point management unit 560 of the determined maximum inter-picture distance information.

An input buffer 510 stores an input video signal and outputs the video signal as an encoding target to an encoding unit 520. Further, when the input buffer 510 receives information indicating that re-encoding is to be performed (retry information) due to the occurrence of the CPB underflow, from a CPB management unit 540, which will be described below, the input buffer 510 outputs a video signal to the encoding unit 520 from a picture of the retry point notified from the retry point management unit 560 again. Further, when the input buffer 510 is notified of retry point information from the retry point management unit 560, the input buffer 510 discards data of a video signal corresponding to stored pictures before the retry point.

The encoding unit 520 encodes the video signal input from the input buffer 510, and outputs an encoded stream to the output buffer 530. Further, when encoding of the picture is completed, the encoding unit 520 outputs a bit rate (bit rate information) generated when the input video signal is encoded, to a CPB management unit 540, and outputs information indicating that picture encoding is completed (encoding completion picture information) to the retry point management unit 560. Further, when the encoding unit 520 receives the retry information from the CPB management unit 540, a video signal from the picture of the retry point in the GOP that is being encoded is input from the input buffer 510 again, and the encoding parameter for re-encoding is input from the parameter adjustment unit 550. Accordingly, the encoding unit 520 performs re-encoding using the input encoding parameter for re-encoding.

The output buffer 530 stores the encoded stream that is a GOP encoding result. When the output buffer 530 is notified of the retry point information from the retry point management unit 560, the output buffer 530 outputs the stored encoded streams corresponding to the pictures before the retry point and removes the data from the output buffer 530. Further, when the retry information is received from the CPB management unit 540, the output buffer 530 discards the stored encoded streams of the GOP that is being encoded.

The CPB management unit 540 obtains a residual bit rate of the CPB changed over time using the bit rate information input from the encoding unit 520. That is, the CPB management unit 540 obtains the residual bit rate of the CPB illustrated in the conceptual diagram of FIG. 1. Also, when the CPB underflow has occurred, the CPB management unit 540 outputs the retry information to the input buffer 510, the encoding unit 520, the parameter adjustment unit 550, and the output buffer 530 to signal that the CPB underflow occurs.

When the parameter adjustment unit 550 receives the retry information from the CPB management unit 540, the parameter adjustment unit 550 inputs the encoding parameter for re-encoding to the encoding unit 520 as described above. Accordingly, the encoding unit 520 performs encoding of the same GOP using an encoding parameter with which a generated bit rate decreases at the time of re-encoding.

The retry point management unit 560 notifies the input buffer 510 and the output buffer 530 of retry point information indicating which picture is a retry point when the CPB underflow has occurred due to the encoding of the next picture based on the encoding completion picture information and the maximum inter-picture distance information.

A flow of an encoding process in the present embodiment will be described with reference to the flowchart of FIG. 17. Hereinafter, correspondence to the flowchart of FIG. 17 is described as S501, S502, . . . , and so on.

The following three cases of a process of encoding a certain GOP will be described.

[Case 1]: The CPB underflow has not occurred in encoding of the GOP.
[Case 2]: The CPB underflow has occurred in encoding of the GOP and could be avoided in re-encoding.
[Case 3]: The CPB underflow has occurred in encoding of the GOP and could not be avoided even in re-encoding.

[Process Example of Case 1]

First, case 1 in which the CPB underflow has not occurred in encoding of the GOP will be described. When the picture of the GOP is input to the input buffer 510, the input buffer 510 stores the picture and inputs the picture as an encoding target picture to the encoding unit 520 (S501). Also, the encoding unit 520 encodes the picture, outputs an encoded stream to the output buffer 530 (the output buffer 530 stores the encoded stream instead of outputting the encoded stream), and outputs bit rate information about the picture to the CPB management unit 540. Further, the encoding unit 520 outputs encoding completion picture information to the retry point management unit 560 (S502).

Here, a default encoding parameter is used for encoding, and a filtering process in the pre-filter unit 521 is applied to the encoding target picture with pre-filter strength corresponding to the default encoding parameter. Further, a DCT coefficient generated in the present picture is quantized by the quantization unit 522 using the quantization parameter according to the default encoding parameter.

The CPB management unit 540 calculates a CPB residual bit rate for the picture based on the bit rate information input from the encoding unit 520. In this example, since the CPB underflow has not occurred, the CPB management unit 540 does not output retry information (S503). When the encoding target picture is a last picture in the input video signal, the output buffer 530 outputs stored encoded streams, and the encoding process is completed (S504). Alternatively, when the encoding target picture is a last picture in the GOP, the output buffer 530 outputs the stored encoded stream, the input buffer 510 discards the stored picture, and a process of encoding a first picture in a next GOP is carried out (S505). Here, since re-encoding has not occurred in the GOP, the encoding parameter is not changed and the process of encoding the first picture in the next GOP is carried out (S506).

[Process Example of Case 2]

Next, case 2 in which the CPB underflow has occurred in encoding of the GOP and could be avoided in re-encoding will be described. When the picture of the GOP is input to the input buffer 510, the input buffer 510 stores the picture and inputs the picture as an encoding target picture to the encoding unit 520 (S501). Also, the encoding unit 520 encodes the picture, outputs an encoded stream to the output buffer 530 (the output buffer 530 stores the encoded stream instead of outputting the encoded stream), and outputs the bit rate information about the picture to the CPB management unit 540 (S502). Here, a default encoding parameter is used for encoding.

The CPB management unit 540 calculates a CPB residual bit rate for the picture based on the bit rate information input from the encoding unit 520. As a result, when the CPB management unit 540 detects the CPB underflow for the picture, the CPB management unit 540 outputs the retry information to the encoding unit 520, the parameter adjustment unit 550, the input buffer 510, and the output buffer 530 (S503).

When the retry has not yet occurred for the GOP that is being encoded (S507), the input buffer 510 outputs the stored picture in a position indicated by the retry point, of the GOP that is being encoded, to the encoding unit 520 (S508), and the parameter adjustment unit 550 outputs the encoding parameter for re-encoding to the encoding unit 520 (S509). Further, the output buffer 530 discards the encoded stream of the GOP that is being encoded. Also, the encoding unit 520 encodes pictures subsequent to the input retry point using the encoding parameter for re-encoding.

Here, the encoding parameter for re-encoding is used for encoding, and a pre-filtering process in the pre-filter unit 521 is applied to the encoding target picture with pre-filter strength corresponding to the encoding parameter for re-encoding (a blurring degree is greater than the default encoding parameter). Further, a DCT coefficient generated in the present picture is quantized by the quantization unit 522 using the quantization parameter according to the encoding parameter for re-encoding (the quantization step size is greater than the default encoding parameter).

Then, the pictures of the GOP are sequentially input from the input buffer 510 to the encoding unit 520 and subjected to the encoding process by the encoding unit 520 only when the CPB underflow does not occur. Also, when encoding of the last picture of the GOP is completed (S505), the encoded stream of the GOP is output from the output buffer 530 and the encoding unit 520 sets the encoding parameter to the default encoding parameter (S506). The process proceeds to a process of encoding a next GOP. Further, an operation when encoding of the last picture of the input video is completed is performed similar to that in case 1 described above.

A conceptual diagram of a change in the encoding parameter when re-encoding has been performed is illustrated in FIG. 7. As in the first embodiment, in the example of FIG. 7, since the CPB underflow has occurred in encoding of the sixth picture in the second GOP2, the encoding parameter for re-encoding to suppress a generated bit rate is set and the GOP2 is re-encoded from its first I picture within a range of the maximum inter-picture distance. Since the occurrence of CPB underflow is suppressed due to the re-encoding, the encoding parameter for re-encoding restores to the default encoding parameter in encoding of next GOP3 and the encoding process is continued.

A conceptual diagram of a transition of the CPB residual bit rate when re-encoding is performed is illustrated in FIG. 8. A line indicated by a bold line is a CPB residual bit rate after re-encoding, as in the first to fourth embodiments. In re-encoding, since a blurring degree is strengthened by a pre-filter and the quantization parameter is greater than the default encoding parameter, the generated bit rate is suppressed and the transition as illustrated, for example, in FIG. 8 is performed such that the CPB underflow is suppressed.

Figure 21:
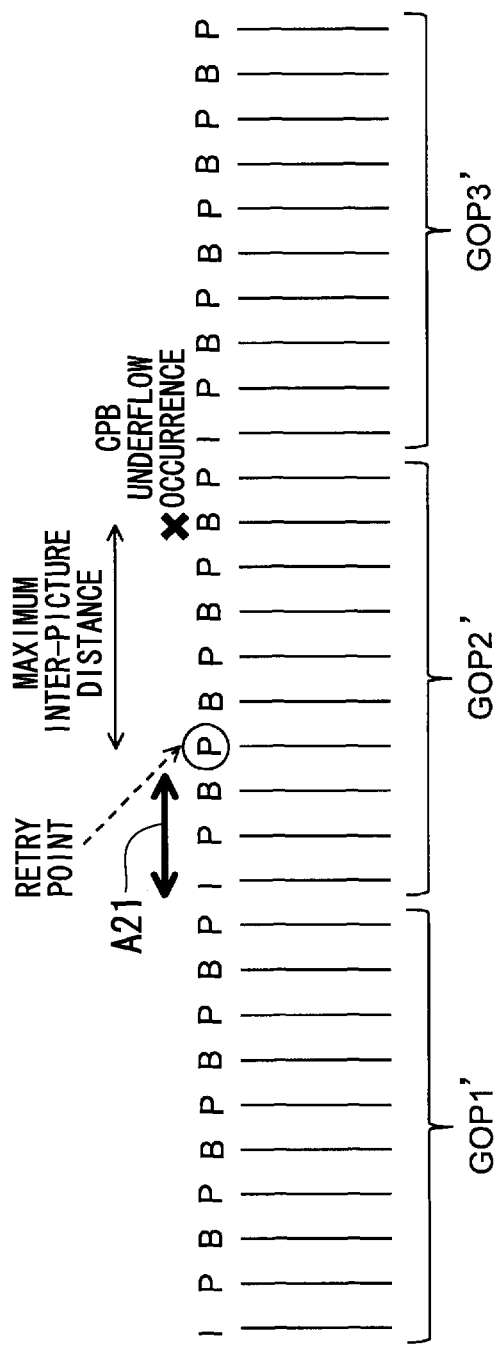
FIG. 21 is a diagram illustrating memory reduction of an input buffer and an output buffer through limitation of a retry point to a maximum inter-picture distance in the fifth embodiment of the present invention.

FIG. 21 is a diagram illustrating a memory reduction of the input buffer and the output buffer through limitation of the retry point to a maximum inter-picture distance. A case in which the retry point is set according to the present embodiment will be described as "case A." For example, a picture from which re-encoding starts when the CPB underflow has occurred is also always considered as the first picture of the encoding-order picture group (e.g., the GOP), unlike the present embodiment. This is referred to as "case B." Case A will be compared with case B. For example, in case A, if the currently encoded picture is a ninth P picture of GOP2' as illustrated in FIG. 21 and the maximum inter-picture distance is "5," the retry point is a fourth picture (P picture) of the GOP2', and three pictures A21 from the first picture of GOP2' earlier than the retry point are not used for re-encoding. For this reason, data in the input buffer 510 and the output buffer 530 corresponding to these pictures need not be held (may be discarded). On the other hand, in a case such as case B, since it is necessary for data corresponding to the pictures to be held in the input buffer 510 and the output buffer 530 until encoding of in GOP2 is completed from the first picture in GOP2', a required memory amount increases. In the present embodiment (case A), since the maximum inter-picture distance is calculated to set the retry point, it is possible to reduce the memory amount, as compared to case B.

[Process Example of Case 3]

Lastly, case 3 in which CPB underflow has occurred in encoding of the GOP and could not be avoided even in re-encoding will be described. In this case, an operation in which the CPB management unit 540 detects the CPB underflow and re-encoding of the GOP is performed is similar to that in case 2. When the CPB underflow occurs during re-encoding of the GOP, encoding is completed (S507). Further, encoding may not be completed and frame dropping may be allowed so that encoded data of the picture in which the CPB underflow has occurred is discarded without completing encoding and a next picture is encoded.

The video encoding control process according to the first to fifth embodiments described above can be realized by a computer and a software program, and the program may be recorded in a computer-readable recording medium or provided via a network.

INDUSTRIAL APPLICABILITY

The present invention can be applied to video encoding technology for encoding of a video signal, so that underflow of a hypothetical buffer such as an encoded picture buffer in a hypothetical decoder does not occur and video quality of an encoded video can be enhanced.

REFERENCE SYMBOLS 110, 210, 310, 410, 510 input buffer
120, 220, 320, 420, 520 encoding unit
121, 221, 321, 421, 521 pre-filter unit
122, 222, 322, 422, 522 quantization unit
130, 230, 330, 430, 530 output buffer
140, 240, 340, 440, 540 CPS management unit
150, 260, 370, 470, 550 parameter adjustment unit
250, 350 retry count management unit
360, 450 CPS state prediction unit
460, 560 retry point management unit
600 maximum inter-picture distance determination unit

The invention claimed is:

1. A video encoding control method performed by a microprocessor operating on executable program steps stored in memory to generate a bit rate and to control the overflow and underflow in a decoder hypothetical buffer and to encode an input video signal, the method comprising the steps of:
sequentially encoding each picture in an encoding-order picture group according to a predetermined encoding parameter, the encoding-order picture group including a predetermined number of pictures and being a collection of pictures successive in an encoding order;
checking if underflow has occurred in the hypothetical buffer based on bit rate information generated in encoding of each picture;
when the underflow has occurred in the hypothetical buffer, changing the encoding parameter in such a manner that a generated bit rate resulting from encoding is reduced and re-encoding the encoding-order picture group that is being encoded from its first picture using the changed encoding parameter,
setting the retry point indicating a position of the picture from which the re-encoding starts based on a maximum inter-picture distance that is a maximum number of pictures capable of being traced back as re-encoding target pictures at the time of re-encoding; and
when encoding of the encoding-order picture group is completed, checking a residual bit rate of the hypothetical buffer, setting the retry point to a first picture in a next encoding-order picture group when the residual bit rate is equal to or greater than a predetermined residual bit rate threshold value, retaining unchanged the retry point when the residual bit rate of the hypothetical buffer is smaller than the predetermined residual bit rate threshold value, and setting the retry point to the first picture in the encoding-order picture group after encoding of the first picture of the next encoding-order picture group is completed without occurrence of the underflow of the hypothetical buffer, wherein:
the step of sequentially encoding includes sequentially encoding each picture in the encoding-order picture group according to an encoding parameter set according to a retry count indicating the number of times of re-encoding,
the step of re-encoding includes incrementing the retry count when the underflow has occurred in the hypothetical buffer and changing the encoding parameter into an encoding parameter with which the generated bit rate resulting from encoding is reduced as a value of the retry count increases.

2. The video encoding control method according to claim 1, comprising a step of checking a residual bit rate of the hypothetical buffer when the underflow has not occurred in the hypothetical buffer until encoding of a last picture in the encoding-order picture group is completed, not changing the value of the retry count when the residual bit rate is smaller than a predetermined residual bit rate threshold value or the retry count is 0, and decrementing the retry count when the residual bit rate is equal to or greater than the residual bit rate threshold value and the retry count is not 0.

3. The video encoding control method according to claim 1, comprising a step of decrementing the retry count when the underflow has not occurred in the hypothetical buffer until encoding of a last picture in the encoding-order picture group is completed.

4. The video encoding control method according to claim 1, wherein:
the encoding parameter is a quantization parameter, filter strength of a pre-filter for the input video signal, or both of the quantization parameter and the filter strength,
when the encoding parameter is the quantization parameter, the encoding parameter in which a step size of the quantization parameter increases as the value of the retry count increases is set, and
when the encoding parameter is the filter strength of the pre-filter, the encoding parameter in which a blurring degree by a filtering process increases as the value of the retry count increases is set.

5. The video encoding control method according to claim 1, wherein when the underflow has not occurred in the hypothetical buffer until encoding of a last picture in the encoding-order picture group is completed in re-encoding of the encoding-order picture group, an encoding parameter used to encode a next encoding-order picture group restores to an encoding parameter value at the time of normal encoding.

6. The video encoding control method according to claim 1, wherein:
when the underflow has not occurred in the hypothetical buffer until encoding of a last picture in the encoding-order picture group is completed in re-encoding of the encoding-order picture group, a residual bit rate of the hypothetical buffer is checked,
an encoding parameter used to encode the next encoding-order picture group is not changed when the residual bit rate is smaller than a predetermined residual bit rate threshold value, and
the encoding parameter restores to an encoding parameter value at the time of normal encoding when the residual bit rate is equal to or greater than the predetermined residual bit rate threshold value.

7. The video encoding control method according to claim 1, wherein:
the encoding parameter is a quantization parameter, filter strength of a pre-filter for the input video signal, or both of the quantization parameter and the filter strength, and
the encoding parameter is changed to increase a step size of the quantization parameter at the time of re-encoding when the encoding parameter is the quantization parameter and to increase a blurring degree by a filtering process when the encoding parameter is the filter strength of the pre-filter, at the time of re-encoding of the encoding-order picture group.

8. A video encoding apparatus in which a generated bit rate is controlled so that a hypothetical buffer in a decoder does not collapse and an input video signal is encoded, the apparatus comprising:
an encoding device that sequentially encodes each picture of an encoding-order picture group according to a predetermined encoding parameter, the encoding-order picture group including a predetermined number of pictures and being a collection of pictures successive in an encoding order;
a buffer management device that checks if underflow has occurred in the hypothetical buffer based on bit rate information generated in encoding of each picture and output retry information when detecting that the underflow has occurred in the hypothetical buffer;
a parameter adjustment device that changes the encoding parameter in such a manner that a generated bit rate resulting from encoding is reduced when the retry information is output and signal the encoding device of the changed encoding parameter;
a buffer state prediction device that checks a residual bit rate of the hypothetical buffer when encoding of the encoding-order picture group is completed and determines whether the residual bit rate is equal to or greater than a predetermined residual bit rate threshold value; and
a retry point management device that sets the retry point to a first picture in a next encoding-order picture group when the residual bit rate of the hypothetical buffer is equal to or greater than the predetermined residual bit rate threshold value according to a determination result of the buffer state prediction device, retaining unchanged the retry point when the residual bit rate of the hypothetical buffer is smaller than the predetermined residual bit rate threshold value, and to set the retry point to the first picture in the encoding-order picture group after encoding of the first picture in the next encoding-order picture group is completed without occurrence of underflow of the hypothetical buffer, wherein
when the retry information is output, the encoding device re-encodes the input video signal from a first picture in the encoding-order picture group that is being encoded, using the encoding parameter changed by the parameter adjustment device, and the encoding device sequentially encodes each picture of the encoding-order picture group according to an encoding parameter set according to a retry count indicating the number of times of re-encoding;
the video encoding apparatus includes a retry count management device that increments the retry count when the retry information is output and that decrements the retry count when the retry information output is deferred until encoding of a last picture in the encoding-order picture group is completed,
the parameter adjustment device sets an encoding parameter with which a generated bit rate resulting from encoding is reduced as a value of the retry count increases, and notifies the encoding device of the set encoding parameter, the encoding parameter being determined according to the retry count, and
the encoding device re-encodes the input video signal from the first picture in the encoding-order picture group set as the retry point using the encoding parameter changed by the parameter adjustment device when the retry information is output.

9. The video encoding apparatus according to claim 8, comprising a buffer state prediction device that checks a residual bit rate of the hypothetical buffer when the encoding of a last picture in the encoding-order picture group is completed without occurrence of the underflow in the hypothetical buffer, and output parameter change/non-change information indicating whether a parameter change is required according to whether the residual bit rate is equal to or greater than a predetermined residual bit rate threshold value,
wherein, when the retry count management device receives the parameter change/non-change information from the buffer state prediction device, the retry count management device does not change the value of the retry count when the parameter change/non-change information indicates that the parameter change is not required or the retry count is 0, and decrements the retry count when the parameter change/non-change information indicates that the parameter change is required and the retry count is not 0.

10. A video encoding apparatus that generates a bit rate and controls the overflow and underflow in a decoder hypothetical buffer and that encodes an input video signal, the apparatus comprising:
an encoding device that sequentially encodes each picture in an encoding-order picture group according to a predetermined encoding parameter, the encoding-order picture group including a predetermined number of pictures and being a collection of pictures successive in an encoding order;
a buffer management device that checks if underflow has occurred in the hypothetical buffer based on bit rate information generated in encoding of each picture, and output retry information when detecting that the underflow has occurred in the hypothetical buffer;
a parameter adjustment device that changes the encoding parameter in such a manner that a generated bit rate resulting from encoding is reduced when the retry information is output, and signal the encoding device of the changed encoding parameter; and
a retry point management device that sets a retry point indicating a position of the picture from which the re-encoding starts based on a maximum inter-picture distance that is a maximum number of pictures capable of being traced back as re-encoding target pictures at the time of re-encoding,
wherein the encoding device re-encodes the input video signal from the picture set as the retry point in the encoding-order picture group that is being encoded using the encoding parameter changed by the parameter adjustment device when the retry information is output.

11. A non-transitory computer-readable recording medium which stores video encoding program for causing a computer to execute a video encoding control method comprising the steps of:
sequentially encoding each picture in an encoding-order picture group according to a predetermined encoding parameter, the encoding-order picture group including a predetermined number of pictures and being a collection of pictures successive in an encoding order;

checking if underflow has occurred in a hypothetical buffer based on bit rate information generated in encoding of each picture;

when the underflow has occurred in the hypothetical buffer, changing the encoding parameter in such a manner that a generated bit rate resulting from encoding is reduced and re-encoding the encoding-order picture group that is being encoded from its first picture using the changed encoding parameter;

setting the retry point indicating a position of the picture from which the re-encoding starts based on a maximum inter-picture distance that is a maximum number of pictures capable of being traced back as re-encoding target pictures at the time of re-encoding; and when encoding of the encoding-order picture group is completed, checking a residual bit rate of the hypothetical buffer, setting the retry point to a first picture in a next encoding-order picture group when the residual bit rate is equal to or greater than a predetermined residual bit rate threshold value, not changing the retry point when the residual bit rate of the hypothetical buffer is smaller than the predetermined residual bit rate threshold value, and setting the retry point to the first picture in the encoding-order picture group after encoding of the first picture of the next encoding-order picture group is completed without occurrence of the underflow of the hypothetical buffer, wherein:

the step of sequentially encoding includes sequentially encoding each picture in the encoding-order picture group according to an encoding parameter set according to a retry count indicating the number of times of re-encoding, the step of re-encoding includes incrementing the retry count when the underflow has occurred in the hypothetical buffer and changing the encoding parameter into an encoding parameter with which the generated bit rate resulting from encoding is reduced as a value of the retry count increases.

* * * * *